(12) United States Patent
Kaciulis et al.

(10) Patent No.: US 12,348,533 B2
(45) Date of Patent: Jul. 1, 2025

(54) ADAPTIVE ONLINE SYSTEM ACCESS CONTROL

(71) Applicant: Netflow, UAB, Vilnius (LT)

(72) Inventors: Karolis Kaciulis, Kaisiadorys (LT); Vaidas Lazauskas, Vilnius (LT)

(73) Assignee: Netflow, UAB, Vilnius (LT)

( * ) Notice: Subject to any disclaimer, the term of this patent is extended or adjusted under 35 U.S.C. 154(b) by 449 days.

(21) Appl. No.: 17/546,825

(22) Filed: Dec. 9, 2021

(65) Prior Publication Data
US 2023/0188539 A1 Jun. 15, 2023

(51) Int. Cl.
*H04L 9/40* (2022.01)
*G06F 21/56* (2013.01)
*G06F 21/57* (2013.01)
*G06F 21/62* (2013.01)

(52) U.S. Cl.
CPC ........ *H04L 63/1416* (2013.01); *G06F 21/566* (2013.01); *G06F 21/57* (2013.01); *G06F 21/6218* (2013.01)

(58) Field of Classification Search
CPC ............. H04L 63/1416; H04L 63/1408; H04L 63/1425; H04L 63/00; H04L 63/1433; H04L 63/1441; H04L 63/126; H04L 63/14; H04L 63/062; H04L 63/1475; G06F 21/566; G06F 21/57; G06F 21/6218
See application file for complete search history.

(56) References Cited

U.S. PATENT DOCUMENTS

| | | | |
|---|---|---|---|
| 8,418,247 B2 | 4/2013 | Sinnaya et al. | |
| 10,291,637 B1 | 5/2019 | Bardenstein | |
| 10,949,534 B2* | 3/2021 | Martin | G06F 21/577 |
| 11,288,346 B1 | 3/2022 | Zubovsky et al. | |
| 2005/0262556 A1* | 11/2005 | Waisman | H04L 63/1408 726/22 |
| 2007/0150955 A1* | 6/2007 | Murase | H04L 63/1416 726/23 |
| 2012/0167219 A1* | 6/2012 | Zaitsev | G06F 21/56 726/24 |
| 2017/0230406 A1 | 8/2017 | Gould et al. | |
| 2017/0279773 A1* | 9/2017 | Koripella | H04L 63/0254 |
| 2017/0337381 A1* | 11/2017 | Mulchandani | G06F 21/52 |
| 2018/0069896 A1 | 3/2018 | Urmanov et al. | |
| 2018/0288063 A1* | 10/2018 | Koottayi | G06F 21/50 |
| 2019/0311121 A1* | 10/2019 | Martin | H04L 63/1441 |

(Continued)

*Primary Examiner* — Daniel B Potratz
*Assistant Examiner* — Taylor P Vu
(74) *Attorney, Agent, or Firm* — Young Basile Hanlon & MacFarlane, P.C.

(57) ABSTRACT

Adaptive online system access control includes obtaining, by a system access control monitor of a client system, from a network interface unit of the client system, a protocol data unit sent to the client system by an external device, wherein the protocol data unit is associated with a communication context. Obtaining the protocol data unit includes, prior to other components of the client system accessing the protocol data unit, identifying, as a current access score for the protocol data unit, a sum of a previous access score associated with the communication context and a modifier value determined for the protocol data unit, and responsive to determining that the current access score is less than an access threshold value, preventing the other components of the client system from accessing the protocol data unit.

20 Claims, 8 Drawing Sheets

(56) References Cited

U.S. PATENT DOCUMENTS

| | | |
|---|---|---|
| 2020/0019703 A1* | 1/2020 | Saldanha .............. G06F 12/145 |
| 2020/0042723 A1* | 2/2020 | Krishnamoorthy ..... G06F 21/45 |
| 2020/0120100 A1 | 4/2020 | Hu et al. |
| 2020/0128035 A1* | 4/2020 | Ford ..................... H04L 67/146 |
| 2021/0168148 A1 | 6/2021 | Boodaei et al. |
| 2021/0243198 A1 | 8/2021 | Naumann zu Koenigsbrueck et al. |
| 2022/0094694 A1* | 3/2022 | Sheppard ................ H04L 63/12 |
| 2022/0109689 A1* | 4/2022 | Hamdi ............... G06Q 10/0635 |
| 2022/0116392 A1* | 4/2022 | Shah .................. H04L 63/0876 |
| 2022/0138292 A1 | 5/2022 | Wojnowicz et al. |
| 2022/0182398 A1* | 6/2022 | St. Pierre ........... H04L 63/0236 |
| 2022/0321563 A1 | 10/2022 | Keller et al. |
| 2022/0368701 A1* | 11/2022 | Achleitner .............. H04L 67/14 |
| 2023/0153425 A1 | 5/2023 | Yuceer et al. |
| 2023/0188539 A1 | 6/2023 | Kaisiadorys et al. |
| 2023/0188545 A1 | 6/2023 | Kaciulis et al. |
| 2023/0188546 A1 | 6/2023 | Kaisiadorys et al. |

* cited by examiner

ADAPTIVE ONLINE SYSTEM ACCESS CONTROL

BACKGROUND

Computing systems, and system features thereof, are subject to malicious and excessive use that reduce the availability, throughput, reliability, and responsiveness of the system by improperly utilizing system resources. As such techniques to mitigate, reduce, or eliminate the resource utilization associated with malicious and excessive activity would be advantageous.

SUMMARY

Disclosed herein are implementations of adaptive online system access control.

An aspect of the disclosure is a method for adaptive online system access control. Adaptive online system access control includes obtaining, by a system access control monitor of a client system, from a network interface unit of the client system, a protocol data unit sent to the client system by an external device, wherein the protocol data unit is associated with a communication context. Obtaining the protocol data unit includes, prior to other components of the client system accessing the protocol data unit, identifying, as a current access score for the protocol data unit, a sum of a previous access score associated with the communication context and a modifier value determined for the protocol data unit, and responsive to determining that the current access score is less than an access threshold value, preventing the other components of the client system from accessing the protocol data unit.

In the aspects described herein, identifying the current access score may include obtaining, by the system access control monitor, a previous access score corresponding to the communication context. In the aspects described herein, identifying the current access score may include determining, by the system access control monitor, the current access score for the protocol data unit based on the previous access score and a determination, by the system access control monitor, whether the protocol data unit is suspicious. In the aspects described herein, in response to a determination, by the system access control monitor, that the protocol data unit is suspicious, determining the current access score may include identifying a suspicious activity modifier value for the protocol data unit, and identifying, as the current access score, a sum of the previous access score and the suspicious activity modifier value. In the aspects described herein, in response to a determination, by the system access control monitor, that the protocol data unit is authentic, determining the current access score may include identifying an authentic activity modifier value for the protocol data unit, and identifying, as the current access score, a sum of the previous access score and the authentic activity modifier value. In the aspects described herein, determining that the current access score is less than the access threshold value may include obtaining, by the system access control monitor, the access threshold value for the communication context. In the aspects described herein, in response to a determination, by the system access control monitor, that the current access score is equal to the access threshold value, outputting, to a user of the client system, a notification indicating that the protocol data unit is delayed pending further data. In the aspects described herein, in response to a determination, by the system access control monitor, that the current access score is greater than the access threshold value, releasing the protocol data unit to a target destination of the protocol data unit in the client system.

Another aspect of the disclosure is an apparatus of a controlled-access computing system. The apparatus includes a non-transitory computer-readable storage medium, and a processor that executes instructions stored in the non-transitory computer-readable storage medium to obtain, from a network interface unit of the controlled-access computing system, a protocol data unit sent to the controlled-access computing system by an external device, wherein the protocol data unit is associated with a communication context. To obtain the protocol data unit the processor executes the instructions to, prior to other components of the controlled-access computing system accessing the protocol data unit, identify, as a current access score for the protocol data unit, a sum of a previous access score associated with the communication context and a modifier value determined for the protocol data unit, and, responsive to an automatic determination that the current access score is less than an access threshold value, preventing the other components of the controlled-access computing system from accessing the protocol data unit.

In the aspects described herein, to identify the current access score, the processor executes the instructions to obtain a previous access score corresponding to the communication context. In the aspects described herein, to identify the current access score, the processor executes the instructions to, responsive to an automatic determination that the protocol data unit is suspicious identify a suspicious activity modifier value for the protocol data unit, and identify, as the current access score, a sum of the previous access score and the suspicious activity modifier value. In the aspects described herein, to identify the current access score, the processor executes the instructions to, responsive to an automatic determination that the protocol data unit is authentic, identify an authentic activity modifier value for the protocol data unit, and identify, as the current access score, a sum of the previous access score and the authentic activity modifier value. In the aspects described herein, to automatically determine that the current access score is less than an access threshold value, the processor executes the instructions to obtain the access threshold value for the communication context. In the aspects described herein, the processor executes instructions stored in the non-transitory computer-readable storage medium to, prior to other components of the controlled-access computing system accessing the protocol data unit, in response to an automatic determination that the current access score is equal to the access threshold value, output, to a user of the controlled-access computing system, a notification indicating that the protocol data unit is delayed pending further data. In the aspects described herein, the processor executes instructions stored in the non-transitory computer-readable storage medium to, prior to other components of the controlled-access computing system accessing the protocol data unit, in response to an automatic determination that the current access score is greater than the access threshold value, release the protocol data unit to a target destination of the protocol data unit in the controlled-access computing system.

Another aspect of the disclosure is a non-transitory computer-readable storage medium, comprising executable instructions that are executed by a processor to perform adaptive online system access control. Adaptive online system access control includes obtaining, by a system access control monitor of a controlled-access computing system, from a network interface unit of the controlled-access computing system, a protocol data unit sent to the controlled-access computing system by an external device, wherein the protocol data unit is associated with a communication context. Obtaining the protocol data unit includes, prior to other components of the controlled-access computing system accessing the protocol data unit, identifying, as a current access score for the protocol data unit, a sum of a previous access score associated with the communication context and a modifier value determined for the protocol data unit, and responsive to determining that the current access score is less than an access threshold value, preventing the other components of the controlled-access computing system from accessing the protocol data unit.

In the aspects described herein, identifying the current access score may include obtaining, by the system access control monitor, a previous access score corresponding to the communication context, determining, by the system access control monitor, the current access score for the protocol data unit based on the previous access score and a determination, by the system access control monitor, whether the protocol data unit is suspicious. In the aspects described herein, in response to a determination, by the system access control monitor, that the protocol data unit is suspicious, determining the current access score may include, identifying a suspicious activity modifier value for the protocol data unit, and identifying, as the current access score, a sum of the previous access score and the suspicious activity modifier value. In the aspects described herein, in response to a determination, by the system access control monitor, that the protocol data unit is authentic, determining the current access score may include identifying an authentic activity modifier value for the protocol data unit, and identifying, as the current access score, a sum of the previous access score and the authentic activity modifier value. In the aspects described herein, responding to the protocol data unit may include obtaining, by the system access control monitor, an access threshold value for the communication context, and comparing, by the system access control monitor, the access threshold value and the current access score. In the aspects described herein, in response to a determination, by the system access control monitor, that the current access score is equal to the access threshold value, outputting, to a user of the controlled-access computing system, a notification indicating that the protocol data unit is delayed pending further data, in response to a determination, by the system access control monitor, that the current access score is greater than the access threshold value, releasing the protocol data unit to a target destination of the protocol data unit in the controlled-access computing system.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
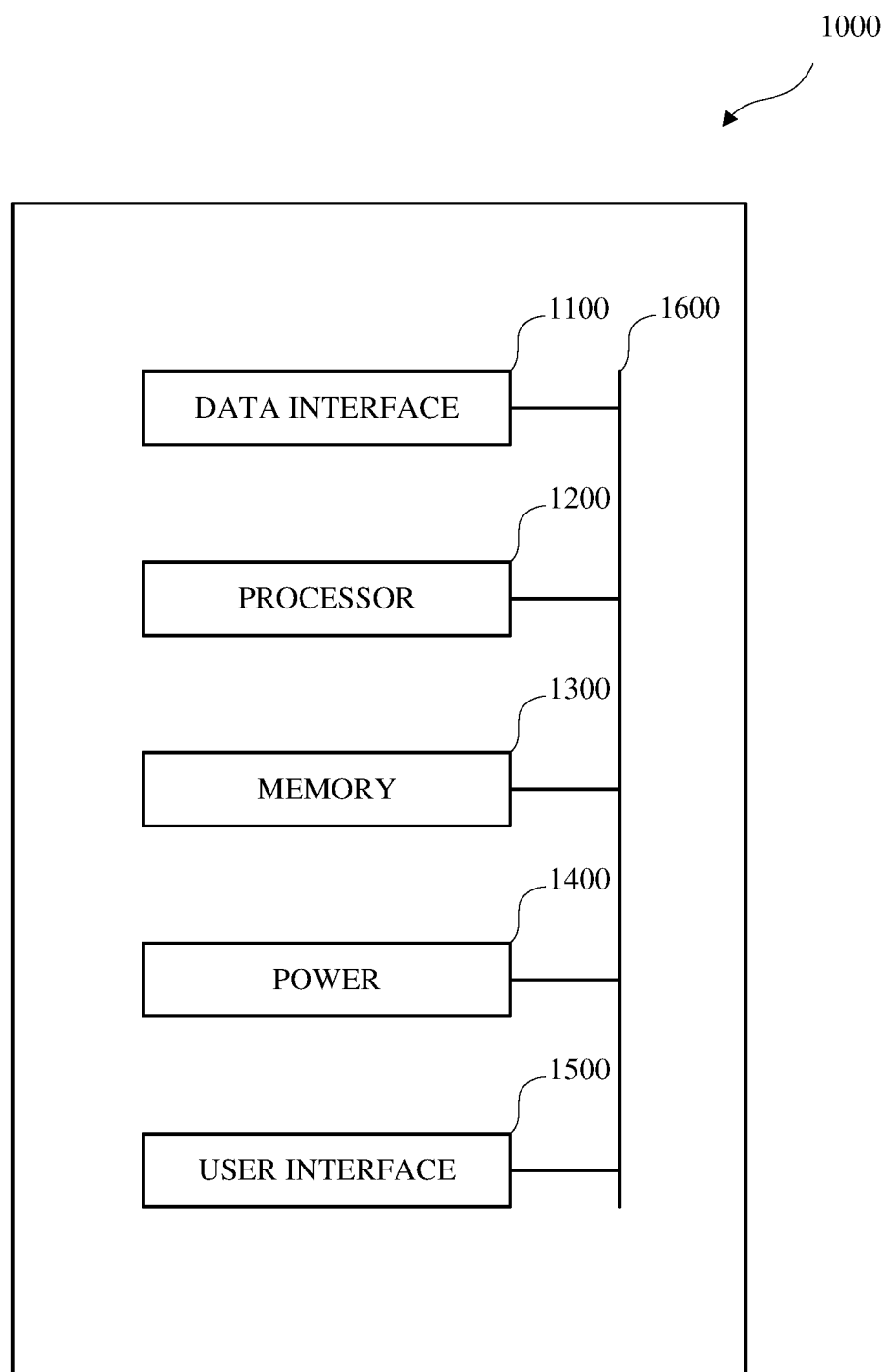
FIG. 1 is a block diagram of an example of a computing device.

Computing communications networks, the systems and devices that use computing communications networks, and applications, services, or microservices implemented by the systems and devices that use computing communications networks may include, or implement, system features, which may include logical system features, such as applications, or application programming interfaces (APIs), services, microservices, logical servers, such as web servers, or hardware resources, such as processing resources, memory resources, communications bandwidth resources, or any other discernable logical or physical features, or combinations thereof, and which may be subject to use that diverges from the use for which the respective network, system, device, application, or service is designed, such as malicious use or excessive use, which may include data scraping, which may be associated with resource utilization, such as processing resource utilization, memory resource utilization, communications bandwidth utilization, and which may degrade performance, introduce errors, or both, such as with respect to legitimate use. For example, malicious or excessive use may cause or result in failures or errors, such as cascading failures, wherein a failure of a component or element may increase the resource utilization at other components and may cause or result in failures or errors of the other components or elements, or of the corresponding systems or networks.

Techniques may be employed to prevent, reduce, limit, or mitigate the resource utilization associated with malicious or excessive use and secure the networks, systems, devices, applications, and services and improve the availability, throughput, latency, and responsiveness thereof. Access control techniques may limit or prevent access with respect to some networks, systems, devices, applications, and services by limiting or preventing some communications, such as unauthorized communications, from being transmitted, or otherwise propagated, beyond a device implementing such techniques or by limiting the availability of resources for processing or communicating some requests. For example, in a client-server configuration, such as a web-browser application operating as a client device communicating with a server application operating as a server device, access control techniques may be implemented at the client side, the server side, or a combination thereof. Some techniques may be implemented, or partially implemented, in a network, or network device, that transports communications between the client device and the server device. Multiple access control techniques may be implemented concurrently, or in combination.

For example, an exponential backoff access control technique may prevent or delay communications, with respect to a defined context, such as within an identified session, subsequent to detecting a failure, access denial, or error by a defined amount of time, or backoff period, which may increase exponentially for respective subsequent failures, denials, or errors. In another example, some requests, such as periodic requests, may be prevented or delayed for a backoff period, a random, or pseudo-random amount of time within a defined range, or a combination of a backoff period and a pseudo-random amount of time, such as to limit concurrent, or contemporaneous, requests, such as associated with multiple uses or multiple client devices. Existing access control techniques may be performed with respect to individual events or requests, which may limit the utility of such techniques and may result in false-positives, wherein legitimate requests are denied, and false-negatives, wherein malicious requests are allowed.

The adaptive online services access control techniques described herein improve on existing access control techniques, such as by reducing resource utilization, preventing failures, improving availability, improving throughput, reducing latency, and improving responsiveness, by determining whether to limit, prevent, or deny access to a respective network, system, device, application, or service by maintaining an aggregate, or cumulative, a running total or score, with respect to a defined context, by identifying, using defined access control patterns, respective activities, actions, events, or requests, as authentic or suspicious, incrementing the score for authentic activities, actions, events, or requests, decrementing the score for suspicious activities, actions, events, or requests, and controlling access based on the aggregate score.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wire-line communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
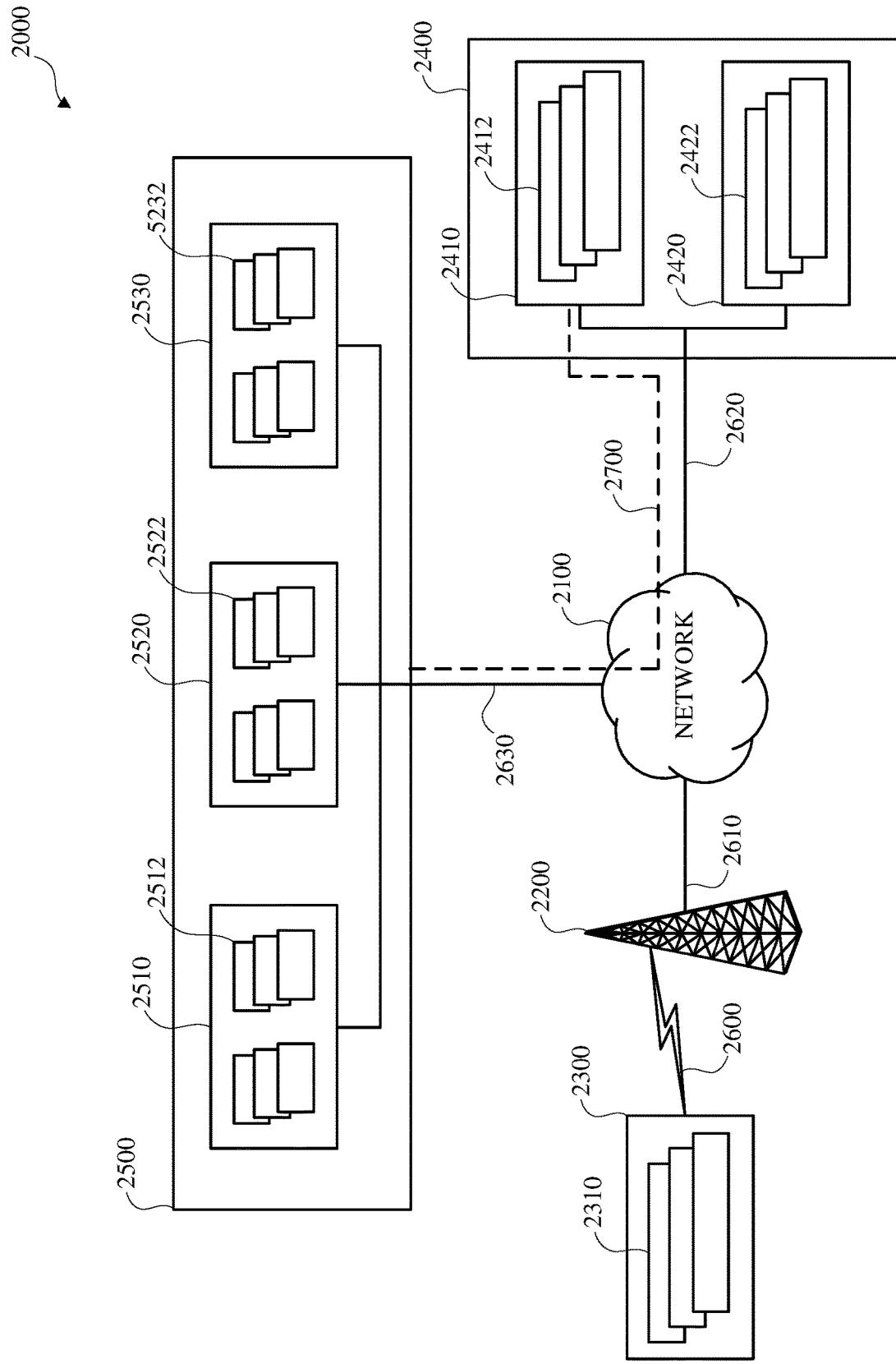
FIG. 2 is a block diagram of an example of a computing and communications system.

FIG. 2 is a diagram of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2530 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2530, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network (VPN). For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 1620, and the third communications link 1630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2530 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2530 may, respectively, be virtual devices operating on shared physical resources.

Figure 3:
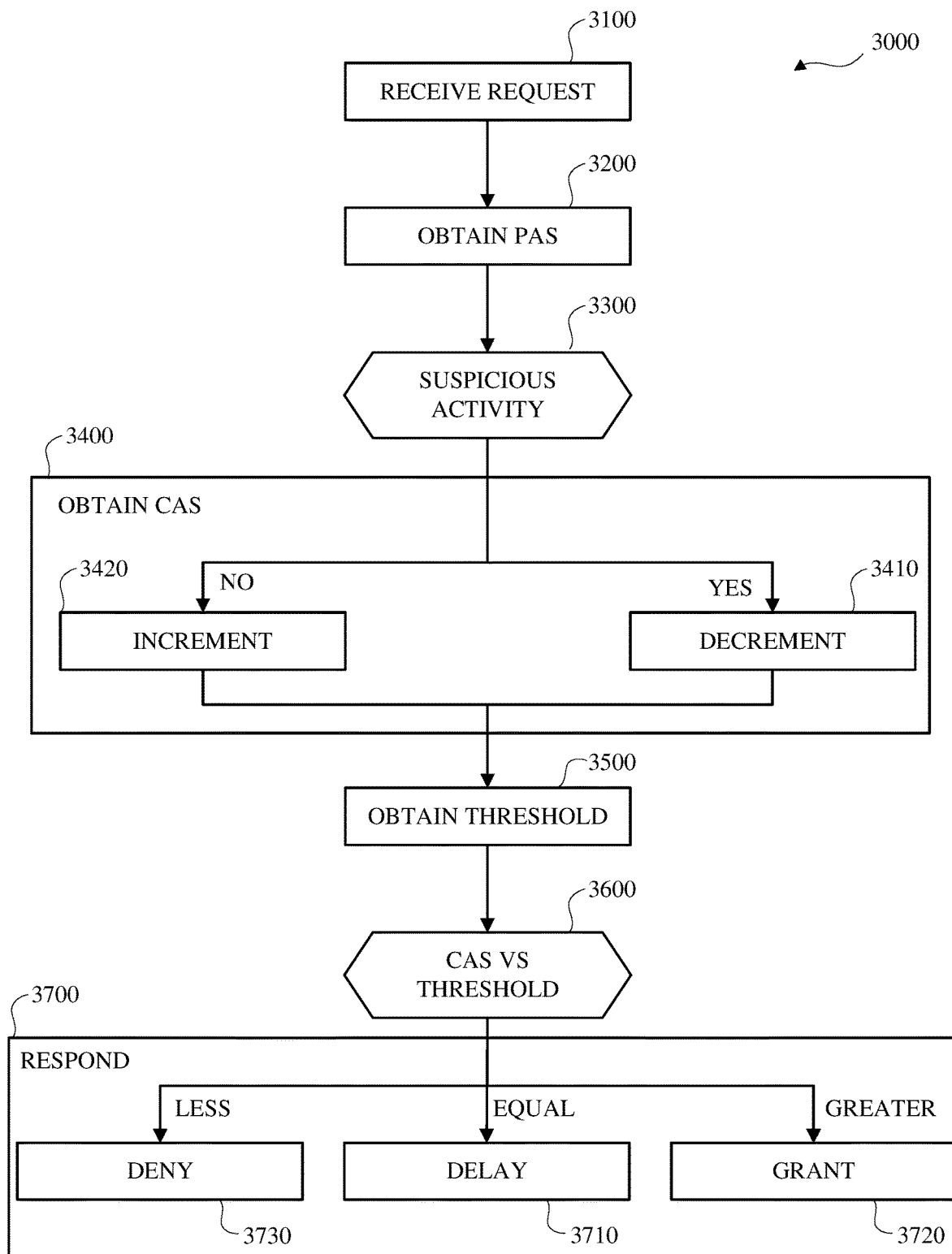
FIG. 3 a flowchart of an example of adaptive online services access control.

FIG. 3 is a flowchart of an example of adaptive online services access control 3000. Adaptive online services access control 3000 may be implemented by one or more computing devices, such as one or more of the computing device 1000 shown in FIG. 1 or one or more of the computing and communications device 2300, 2410, 2420, 2510, 2520, 2530 shown in FIG. 2, or by a system, such as the network 2500 shown in FIG. 2, including one or more computing devices.

A controlled-access computing system includes one or more component computing devices, one or more system features, or a combination thereof, wherein a component computing device may be a system feature. For example, the network 2500 shown in FIG. 2 may be an example of a controlled-access computing system, wherein the computing devices 2510, 2520, 2530 are the component computing devices of the server system, and the documents, applications, or services 2512, 2522, 2532 are respective system features. The system features are, respectively, documents, records, services, other computing resources of the system, or a combination thereof. For example, the component computing device may be a web server and the system feature may be a webpage of a website hosted by the component computing device. One or more of the component computing devices of the controlled-access computing system implements, or is, a system access control monitor. For example, an edge server of the controlled-access computing system may implement the system access control monitor.

Communications, such as messages or signals, received by, or otherwise accessed by, the controlled-access computing system include communications sent to, or sent with respect to, a target recipient in the controlled-access computing system, such as one or more of the component computing devices of the server system or one or more of the system features. The communications are received by the controlled-access computing system from respective client devices, which are computing devices, such as the computing device 1000 shown in FIG. 1 or one or more of the computing and communications device 2300, 2410, 2420, 2510, 2520, 2530 shown in FIG. 2. The client device may be a computing device outside, or external to, the controlled-access computing system. For example, the controlled-access computing system may include the network 2500 shown in FIG. 2 and the client device may be one the computing and communications device 2300, 2410, 2420, shown in FIG. 2. In some implementations, the controlled-access computing system includes the client device.

The controlled-access computing system, or a portion thereof, includes data describing, specifying, setting, or defining, one or more access-control parameters for respective system features, or combinations of system features. For example, a system feature associated with system authentication, such as logging in, with respect to the controlled-access computing system, or a portion thereof, is associated with one or more access-control parameters. In another example, a system feature associated with financial data, such as payment data, with respect to the controlled-access computing system, or a portion thereof, is associated with one or more access-control parameters. In another example, a system feature is identified as utilizing a large amount of system resources, such as processing resources, memory resources, bandwidth resources, or other computing resources, and is associated with one or more access-control parameters. In another example, a system feature that includes data that is otherwise identified as sensitive is associated with one or more access-control parameters. In some implementations, a system feature may be associated with, such as related to, such as in a hierarchy, one or more other system features and the access-control parameters for the system feature may inherited, obtained, identified, determined, or calculated, based on the respective access-control parameters for the other, related, system feature or features. The access-control parameters include an access-control threshold. For example, the access-control threshold may be expressed or represented as an access-control threshold value, such as an integer value. In some implementations, the access-control threshold value may be dynamically determined, or calculated, based on other access-control parameters. In some implementations, a system feature may be associated with a defined access-control threshold value, such as negative one (−1), indicating that adaptive online services access control 3000 is otherwise omitted with respect to the system feature. In some implementations, an expressly defined system feature-specific access-control threshold value for a system feature may be unavailable, and a system-specific access-control threshold value, such as zero (0), which may be system configurable, may be identified as the access-control threshold value for the system feature.

Adaptive online services access control 3000 includes receiving a request to access a system feature at 3100, obtaining a previous access score at 3200, determining whether the request constitutes suspicious activity at 3300, adjusting the score at 3400, obtaining a threshold at 3500, comparing the adjusted score and the threshold at 3600, and responding to the request at 3700.

Adaptive online services access control 3000 includes receiving, by the system access control monitor, a request, from a client device, to access a system feature at 3100. The system access control monitor receives, obtains, or otherwise accesses, communications sent, by, from, or on behalf of, a client computing device, to, or with respect to, a target recipient in the controlled-access computing system. The system access control monitor receives, obtains, or otherwise accesses, the communications prior to the respective communications being received, or otherwise accessed, by the target recipient. Although described as being associated with a client device, in some implementations, the communications may be associated with another context, such as with a network, a domain, an IP address, a range of IP addresses, an application, a process, a session, or another data element, or combination of data elements, capable of distinctly identifying the respective communications. One or more of the communications respectively includes the request to access the system feature of the controlled-access computing system. Obtaining the request at 3100 may include obtaining other data associated with the request, such as data corresponding to other communications associated with the request, such as a sequence of communications that includes the request. In some implementations, receiving, or obtaining, the request, or other activity data associated with a distinct use context, may include logging, or otherwise recording, the request, or other activity data in association with data uniquely identifying the use context.

Although described as a request to access, the request may be one or more communications, signals, or messages that correspond with or relate to access, including read access, write access, or both, of the system feature. For example, a message, such as an Internet Control Message Protocol (ICMP) Echo Request message, or a packet, frame, or other datagram, indicating a system feature, such as by including an IP address associated with the system feature as a destination address, may be identified as a request for access to that system feature.

In some implementations, the system access control monitor, or a portion thereof, may be implemented on the client device and obtaining the request may include obtaining the request prior to the transmission of the request, or related communications, by the client device.

The communications, messages, or signals are communicated, such as sent from the client device and received by the controlled-access computing system, using a computing communications protocol, which may be an application layer computing communications protocol, such as the Hypertext Transport Protocol, the Hypertext Transport Protocol Secure (HTTPS), or another computing communications protocol. For example, the client device may operate an application, or process, such as a web browser, that may send the request to obtain a webpage from a web server in the controlled-access computing system using the Hypertext Transport Protocol.

In some implementations, the client device may implement the system access control monitor, or a portion thereof. For example, the system access control monitor, or a portion thereof, may be an application, process, or thread operating on the client device, or may be computer accessible code or instructions performed by an application, process, or thread operating on the client device. In implementations wherein the client device implements the system access control monitor, or a portion thereof, the system access control monitor, or a portion thereof, may obtain, or otherwise access, the request prior to the request leaving the client device. For example, a user of the client device may operate an application on the client device, such as a web browser, to access a web site hosted by the controlled-access computing system, which may include obtaining a web page, or other system feature, from the controlled-access computing system that includes the system access control monitor, or a portion thereof, such as implemented as code included in the web page, or as code included in the web page that causes the client device, or application, to obtain the system access control monitor, such as by downloading the system access control monitor, or a portion thereof, and execute or operate the system access control monitor.

Figure 4:
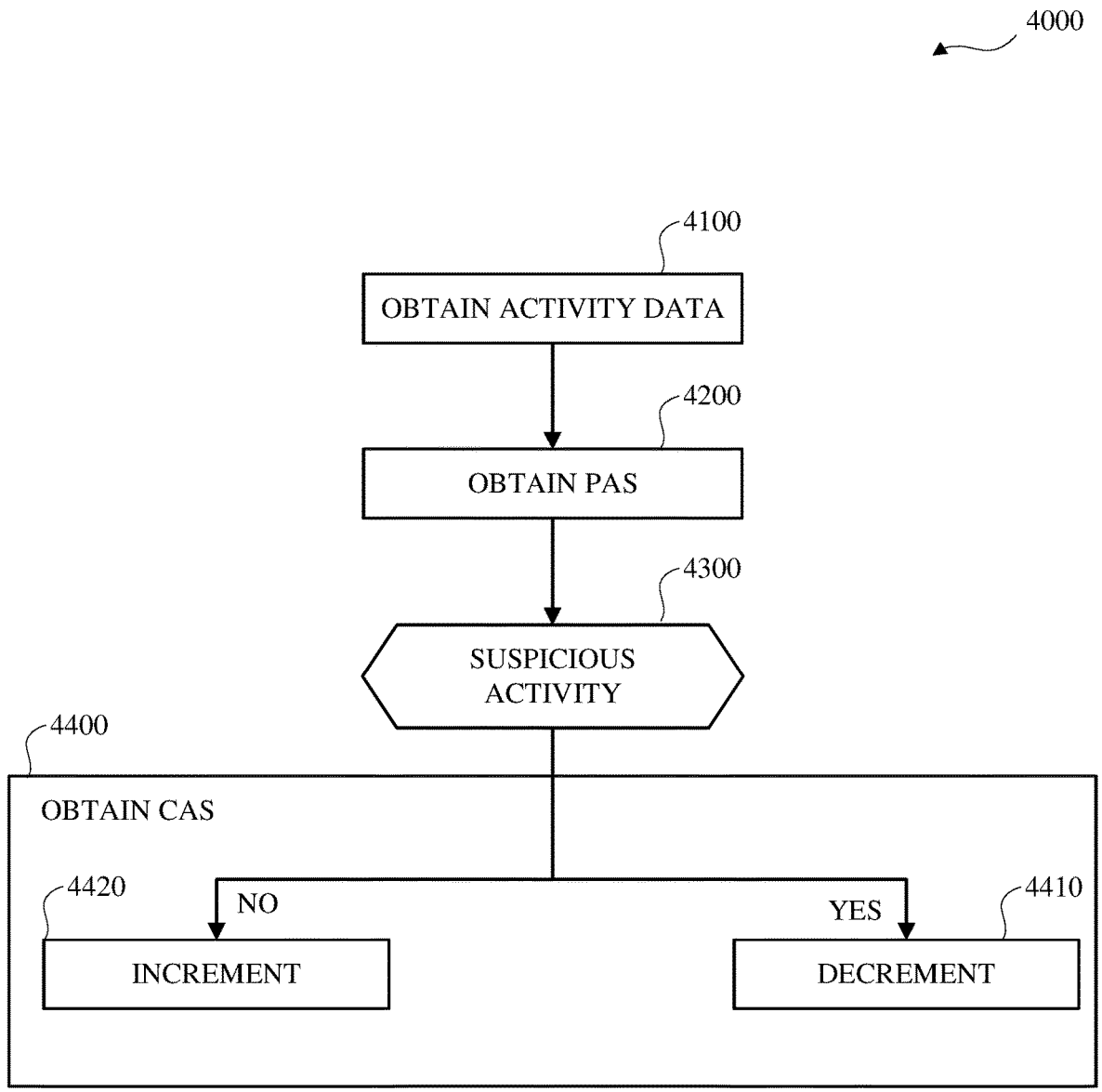
FIG. 4 is a flowchart of an example of obtaining an access score.

Adaptive online services access control 3000 includes obtaining a previous access score (PAS) corresponding to the request at 3200. The previous access score is obtained by the system access control monitor, or a portion thereof, for the request to access a system feature at 3200. For example, the communication including the request for access may be associated with an IP address and the previous access score may be a most recent access score associated with the IP address prior to the system access control monitor, or the portion thereof, obtaining the communication. In another example, the communication including the request for access may be associated with a range of IP addresses and the previous access score may be a most recent access score associated with the range of IP addresses prior to the system access control monitor, or the portion thereof, obtaining the communication. In another example, the communication including the request for access may be associated with a session identifier (session ID) and the previous access score may be a most recent access score associated with the session identifier prior to the system access control monitor, or the portion thereof, obtaining the communication. In another example, the communication including the request for access may be associated with a user identifier (user ID) and the previous access score may be a most recent access score associated with the user identifier prior to the system access control monitor, or the portion thereof, obtaining the communication. In some implementations, a previous access score may be unavailable and a defined value, such as zero (0), may be identified as the previous access score. An example of obtaining an access score, such as the previous access score, is shown in FIG. 4.

Adaptive online services access control 3000 includes determining, by the system access control monitor, or a portion thereof, whether the request constitutes suspicious activity at 3300. Determining whether the request constitutes suspicious activity includes evaluating the request using one or more defined access control patterns, or rules. The access control patterns may be based on data that may be extracted from respective requests, or may be otherwise associated with the respective requests. For example, the defined access control patterns may, respectively, express parameters of the corresponding activity that are consistent with data generated in accordance with user input obtained in response to human interaction with the client device to perform the corresponding activity, such that the request data, or other activity data evaluated using the defined access control patterns, that differs, or diverges, from the parameters of the activity defined or described in the respective defined access control patterns, is identified as suspicious, indicating that the request data, or other activity data evaluated using the defined access control patterns, may be data generated automatically or programmatically, such as bot-like data. In some implementations, one or more of the defined access control patterns may be implemented using a machine learning mathematical model.

An access control pattern may be a burst request access control pattern, which may define or describe a temporal span, such as one second, and may define or describe a number, or cardinality, such as a maximum cardinality, of identified actions, activity, or events (burst threshold) with respect to the temporal span, such that a number, or cardinality, of identified actions, activity, or events corresponding to the temporal span that is greater than the maximum cardinality of identified actions, activity, or events is identified as suspicious. The identified actions, activity, or events may include, for example, distinct communications, messages, or requests. In another example, the identified actions, activity, or events may include user interface interaction activity or events, such as activity or events indicating pointer clicks or scrolling. A burst request access control pattern may represent a defined limit to the frequency of activity that may reasonably be associated with human control, wherein a cardinality of events that is greater than the burst threshold indicates programmatic, rather than human, control.

An access control pattern may be a request sequence access control pattern, which may define or describe one or more defined sequences of requests, such that a sequence of requests that differs from the defined sequences of requests may be identified as suspicious. For example, the request sequence access control patterns for the controlled-access computing system may include a request sequence access control pattern that describes a sequence of a request to access a first system feature, or one or more of a first set of system features, followed by a request to access a second system feature, or one or more of a second set of system features, and a request sequence access control pattern that describes the request to access the second system feature in the absence of the request to access the first system feature may be unavailable, such that a request to access the second system feature subsequent to a request to access the first system feature may be identified as authentic, and a request to access the second system feature in the absence of a request to access the first system feature may be identified as suspicious.

An access control pattern may be a target access control pattern, which may define or describe one or more defined target system features, such that a request to expressly access the target system feature is identified as suspicious.

An access control pattern may be an access parameters access control pattern, which may define or describe one or more access parameters, or metadata, associated with the request, and corresponding values thereof. One or more of the access parameters, or the corresponding values thereof, may be defined or described as authentic access parameters, or authentic access parameter values. For example, an authentic browser user agent parameter may be defined or described, wherein one or more authentic browser user agent identifier values may be defined or described, such that a browser user agent identifier value associated with the request that matches one of the authentic browser user agent identifier values may be identified as authentic, such that the request is identified as authentic, and a browser user agent identifier value associated with the request that differs from the authentic browser user agent identifier values may be identified as suspicious, such that the request is identified as suspicious. One or more of the access parameters, or the corresponding values thereof, may be defined or described as suspicious access parameters, or suspicious access parameter values. For example, a suspicious hardware identifier parameter may be defined or described, wherein one or more suspicious hardware identifier values may be defined or described, such that a hardware identifier value associated with the request that matches one of the suspicious hardware identifier values may be identified as suspicious, such that the request is identified as suspicious, and a hardware identifier value associated with the request that differs from the suspicious hardware identifier values may be identified as authentic, such that the request is identified as authentic.

In another example, a suspicious metadata, or header data, parameter may be defined or described, wherein one or more suspicious metadata, or header data, values may be defined or described, such as a suspicious HTTP version value or values, such that a metadata, or header data, value included with the request that matches one of the suspicious metadata, or header data, values may be identified as suspicious, such that the request is identified as suspicious, and a metadata, or header data, value included with the request that differs from the suspicious metadata, or header data, values may be identified as authentic, such that the request is identified as authentic. In another example, an authentic metadata, or header data, parameter may be defined or described, wherein one or more authentic metadata, or header data, values may be defined or described, such that a metadata, or header data, value, such as an authentic HTTP version value or values, included with the request that differs from the authentic metadata, or header data, values may be identified as suspicious, such that the request is identified as suspicious, and a metadata, or header data, value included with the request that matches the authentic metadata, or header data, values may be identified as authentic, such that the request is identified as authentic.

In another example, a suspicious protocol data unit parameter or value may be defined or described, wherein one or more suspicious protocol data unit parameters or values may be defined or described, such as a parameter of a packet header, such as a TCP window size parameter, such that a protocol data unit parameter or value included with the request that matches one of the suspicious protocol data unit parameters or values may be identified as suspicious, such that the request is identified as suspicious, and a protocol data unit parameter or value included with the request that differs from the suspicious protocol data unit parameters or values may be identified as authentic, such that the request is identified as authentic. In another example, an authentic protocol data unit parameter or value may be defined or described, wherein one or more authentic protocol data unit parameters or values may be defined or described, such that a protocol data unit parameter or value, such as an authentic TCP window size, included with the request that differs from the authentic protocol data unit parameters or values may be identified as suspicious, such that the request is identified as suspicious, and a protocol data unit parameter or value included with the request that matches the authentic protocol data unit parameters or values may be identified as authentic, such that the request is identified as authentic.

In some implementations, application layer data, such as a message payload, may be identified as suspicious such that the corresponding message or request is identified as suspicious. For example, an application layer payload may be identified as including malicious content and the corresponding request, message, or packets may be identified as suspicious. In some implementations, one or more of the access parameters, or the corresponding values thereof, may be defined or described as combinations of access parameters, or the corresponding values thereof, such as suspicious combinations, authentic combinations, or both.

The defined access control patterns may be stored in a repository or library, such as a database, or other data structure, available to, or accessible by, the system access control monitor.

In some implementations, the defined access control patterns may be modified or maintained, which may include adding a defined access control pattern, modifying a previously included defined access control pattern, or deleting, or otherwise removing, a defined access control pattern. For example, the defined access control patterns may be updated periodically, such as in accordance with a defined update schedule. In another example, the defined access control patterns may be updated in response to an event, such as a detected event corresponding to one or more defined update triggers.

Adaptive online services access control 3000 includes obtaining a current access score (CAS) at 3400. Obtaining the current access score at 3400 includes adjusting, updating, or modifying the previous access score obtained at 3200. Obtaining the current access score at 3400 includes obtaining, such as by the system access control monitor, an activity modifier value. Obtaining the current access score at 3400 includes determining a current, adjusted, or updated, access score for the request, such as by the system access control monitor, based on the activity modifier value and the previous access score, corresponding to the request, obtained at 3200, such as by combining the activity modifier value and the previous access score, such as by determining, or calculating, a sum of the activity modifier value and the previous access score. Although not expressly shown in FIG. 3, the current, adjusted, or updated, access score may be used as the previous access score for a subsequent, such as immediately subsequent, iteration, or performance, of adaptive online services access control 3000 related to the current request, such as having the session identifier of the current request. The activity modifier value may be an authentic activity modifier value or a suspicious activity modifier value.

For example, the system access control monitor, or a portion thereof, may determine at 3300 that the request constitutes suspicious activity as indicated by the directional line labeled "YES" between block 3300 and block 3410 in FIG. 3, wherein the activity modifier value is a suspicious activity modifier value, such as a negative value, such as negative one (−1), and obtaining the current access score includes decrementing the score at 3410 by adding the negative value suspicious activity modifier to the previous access score. In some implementations, obtaining the suspicious activity modifier value may be omitted such that decrementing the score at 3410 includes subtracting a defined value, such as one (1), or, equivalently, adding a defined negative value, such as negative one (−1), to the previous access score. Other defined values, such as positive or negative integer values or real number values, may be used.

In another example, the system access control monitor, or a portion thereof, may determine at 3300 that the request constitutes authentic activity as indicated by the directional line labeled "NO" between block 3300 and block 3420 in FIG. 3, wherein the activity modifier value is an authentic activity modifier value, such as a positive value, such as one (1), and obtaining the current access score includes incrementing the score at 3420 by adding the positive value authentic activity modifier to the previous access score. In some implementations, obtaining the authentic activity modifier value may be omitted such that incrementing the score at 3420 includes adding a defined value, such as one (1), to the previous access score. Other defined values, such as positive or negative integer values or real number values, may be used.

In some implementations, the activity modifier value may be obtained prior to decrementing the score at 3410 or incrementing the score at 3420. In some implementations, decrementing the score at 3410 may include obtaining the activity modifier value as a suspicious activity modifier value. In some implementations, incrementing the score at 3420 may include obtaining the activity modifier value as an authentic activity modifier value.

Adaptive online services access control 3000 includes obtaining an access threshold value for the requested system feature at 3500. The system features of the controlled-access computing system are, respectively, associated with corresponding access threshold values. The magnitude of the access threshold value may be proportional to the extent to which access to the resource is controlled. For example, one or more of the system features may be identified as being available for public access by assigning a public access value, such as zero (0) as the access threshold value for the respective system feature.

In some implementations, the system features of the system may be organized in respective groups, layers, or classes of features respectively associated with a corresponding access threshold value. For example, one or more system features, such as a defined set of web pages, may be organized as a first group of system features allocated or assigned a first access threshold value, such as zero (0), which may correspond with public access availability, a second group of system features may be allocated or assigned a second access threshold value, such as one (1), and a third group of system features may be allocated or assigned a third access threshold value, such as ten (10).

Adaptive online services access control 3000 includes comparing the current access score obtained at 3400 and the access threshold value at 3600 and responding to the request at 3700.

The current access score may equal or match the access threshold value and responding to the request may include delaying, or otherwise obtaining other data prior to denying or granting the request at 3710. For example, the system access control monitor may determine that the current access score equals or matches the access threshold value, and, in response to the determination that the current access score is equal to, or matches, the access threshold value, the system access control monitor may send a response indicating that access to the system feature is pending, or delayed, to the client device. In another example, the system access control monitor may omit sending a response in response to the determination that the current access score is equal to, or matches, the access threshold value until other data is obtained such that a current, adjusted, or updated score, adjusted or updated based on the other data, differs from the access threshold value.

The current access score may be greater than the access threshold value and responding to the request may include granting the request at 3720. For example, the system access control monitor may determine that the current access score is greater than the access threshold value, and, in response to the determination, by the system access control monitor, that the current access score is greater than the access threshold value, the system access control monitor may send, or otherwise make available, the request to the target system feature, or to a device hosting the target system feature. In some implementations, the request may be identified as suspicious at 3300, system access control monitor may determine that the current access score, subsequent to decrementing the score at 3410, is greater than the access threshold value, and access to the system feature may be granted. In some implementations, granting the request may include opening a port in a firewall for the client device, such as based on IP address, to access the server feature, which may include opening the port with respect to a defined IP address or a defined set of IP addresses, such as IP addresses of client devices.

The current access score may be less than the access threshold value and responding to the request may include denying the request at 3730. For example, the system access control monitor may determine that the current access score is less than the access threshold value, and, in response to the determination, by the system access control monitor, that the current access score is less than the access threshold value, the system access control monitor may generate and send, to the client device, a response indicating that access to the system feature is denied. In some implementations, the request may be identified as authentic at 3300, system access control monitor may determine that the current, adjusted, or updated score, subsequent to incrementing the score at 3410, is less than the access threshold value, and access to the system feature may be denied.

FIG. 4 is a flowchart of an example of obtaining an access score 4000. Obtaining an access score 4000 may be implemented by one or more computing devices, such as one or more of the computing device 1000 shown in FIG. 1 or one or more of the computing and communications device 2300, 2410, 2420, 2510, 2520, 2530 shown in FIG. 2, or by a system, such as the network 2500 shown in FIG. 2, including one or more computing devices.

Obtaining an access score 4000 includes obtaining activity data at 4100, obtaining a previous access score (PAS) at 4200, determining whether the activity data indicates suspicious activity at 4300, and obtaining a current access score at 4400. Obtaining an access score 4000 may be performed periodically, such as in accordance with a defined temporal period, such as one second. Obtaining an access score 4000 may be performed in response to detecting one or more defined events, interactions, or activities. Periodic performance of obtaining an access score 4000 may be performed in combination with event-based performance of obtaining an access score 4000.

Activity data is obtained at 4100. Obtaining the activity data at 4100 may be similar to receiving a request to access a system feature as shown at 3100 in FIG. 3, except as is described herein or as is otherwise clear from context. Obtaining the activity data at 4100 may include obtaining data representing user input data corresponding to interactions between the user and the client device, such as data indicating a user interaction with a user interface element, such as pointer movement or hovering, or a click, tap, or other selection of the user interface element.

A previous access score is obtained at 4200. Obtaining the previous access score at 4200 may be similar to obtaining the previous access score as shown at 3200 in FIG. 3, except as is described herein or as is otherwise clear from context. For example, the previous access score obtained at 4200 may be an access score generated by a previous performance, or iteration, of obtaining an access score 4000 with respect to a defined context for obtaining the access score. The defined context may be data accessible by the system access control monitor, such as an IP address of the client device, or a portion thereof, associated with the activity, an application identifier associated with the activity, a process identifier associated with the activity, a session identifier associated with the activity, a user identifier associated with the activity, or another data element or combination of data elements capable of distinctly identifying a context of the activity and accessible by the system access control monitor. A previously generated access score, for the respective context, may be unavailable and a defined value, such as zero (0), may be used. The activity data may include activity data corresponding to one activity, interaction, or event, or may include activity data corresponding to a sequence of activities, interactions, or events, such as within a defined temporal span, such as one second, which may be on a rolling window basis.

Whether the activity data indicates suspicious activity may be determined at 4300. Determining whether the activity data indicates suspicious activity at 4300 may be similar to determining whether a request constitutes suspicious activity as shown at 3300 in FIG. 3, except as is described herein or as is otherwise clear from context. For example, obtaining an access score 4000, including determining whether the activity data indicates suspicious activity at 4300, may be performed, with respect to a context, in the absence of an identified request to access a system resource, wherein the context is associated with the controlled-access computing system.

The current access score is obtained at 4400. Obtaining the current access score at 4400 is similar to obtaining the current access score as shown at 3400 in FIG. 3, except as is described herein or as is otherwise clear from context. Obtaining the current access score at 4400 includes obtaining, such as by the system access control monitor, an activity modifier value. Obtaining the current access score at 4400 includes, in response to a determination at 4300 that the activity is suspicious activity, as indicated by the directional line labeled "YES" between block 4300 and block 4410 in FIG. 4, decrementing the score at 4410. Obtaining the current access score at 4400 includes, in response to a determination at 4300 that the activity is authentic activity, as indicated by the directional line labeled "NO" between block 4300 and block 4420 in FIG. 4, incrementing the score at 4410.

In some implementations, obtaining the activity modifier value may include obtaining an activity-specific activity modifier value. For example, a first activity may be associated with a first activity-specific activity modifier value and a second activity may be associated with a second activity-specific activity modifier value, which may differ from the first activity modifier value. For example, the activity may include an authentication request including a password (string value) determined to be invalid, and the corresponding activity modifier value may be negative one (−1), or the activity may include a series of such invalid requests and each successive request may be associated with a respective activity modifier value having a greater magnitude, or absolute value. In another example, a first access control pattern may define a first threshold number, or cardinality, of actions or events in a defined temporal span and a second threshold number, or cardinality, of actions or events in the defined temporal span, such that an activity, or set of activities, that includes a number, or cardinality, of actions or events within the defined temporal span, that is greater than the first threshold and less than, or equal to, the second threshold may be associated with a first activity modifier value, and an activity, or set of activities, that includes a number, or cardinality, of actions or events within the defined temporal span, that is greater than the second threshold may be associated with a second activity modifier value that is greater than the first activity modifier value.

Although not shown separately in FIG. 4, in some implementations, the activity data obtained at 4100 may be determined to be neutral, or indeterminate, at 4300, adjusting the score at 4400 may be omitted, and the previous access score obtained at 4200 may be used as the access score.

Figure 5:
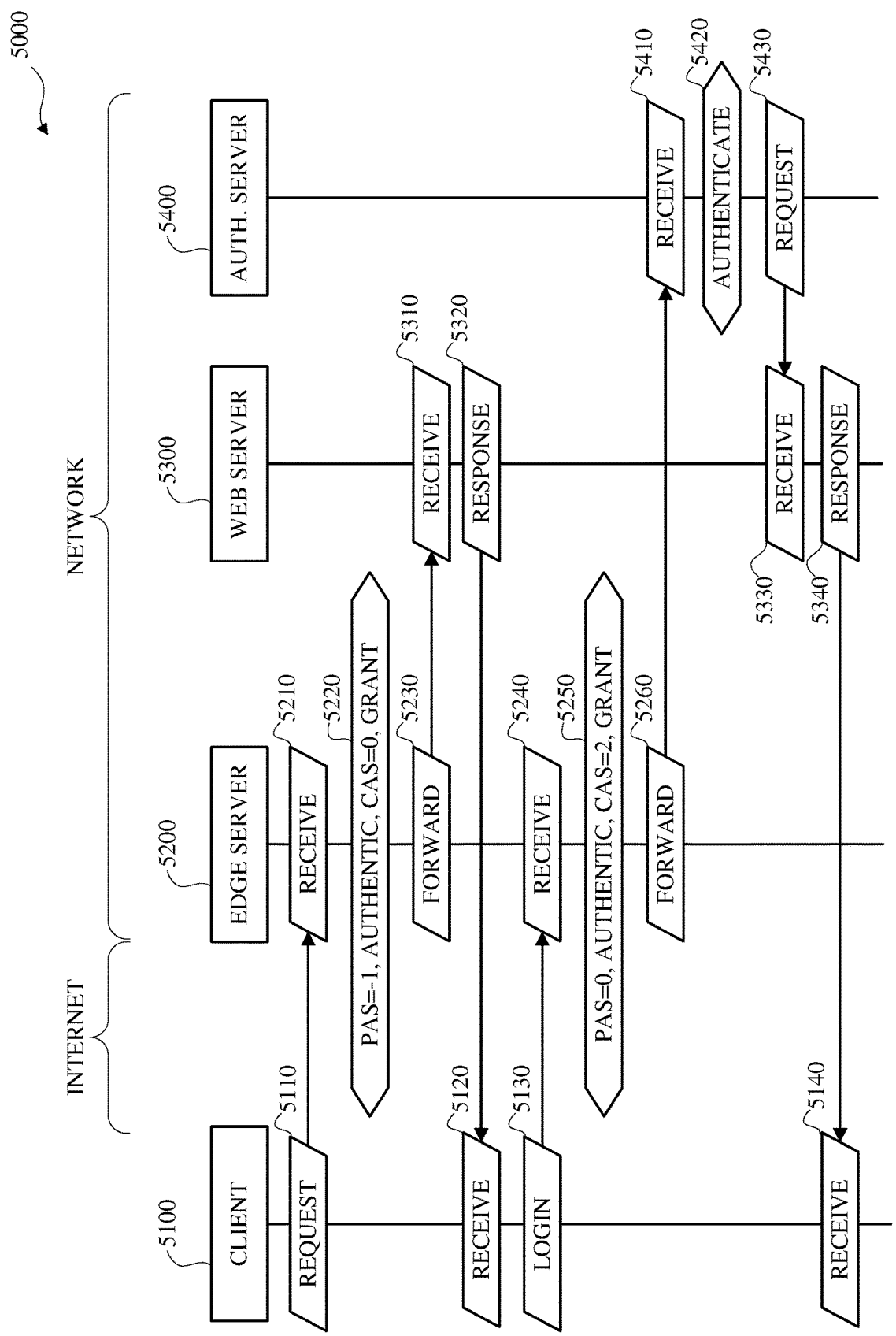
FIG. 5 is a flow diagram of an example of a first sequence of actions using adaptive online services access control.
Figure 6:
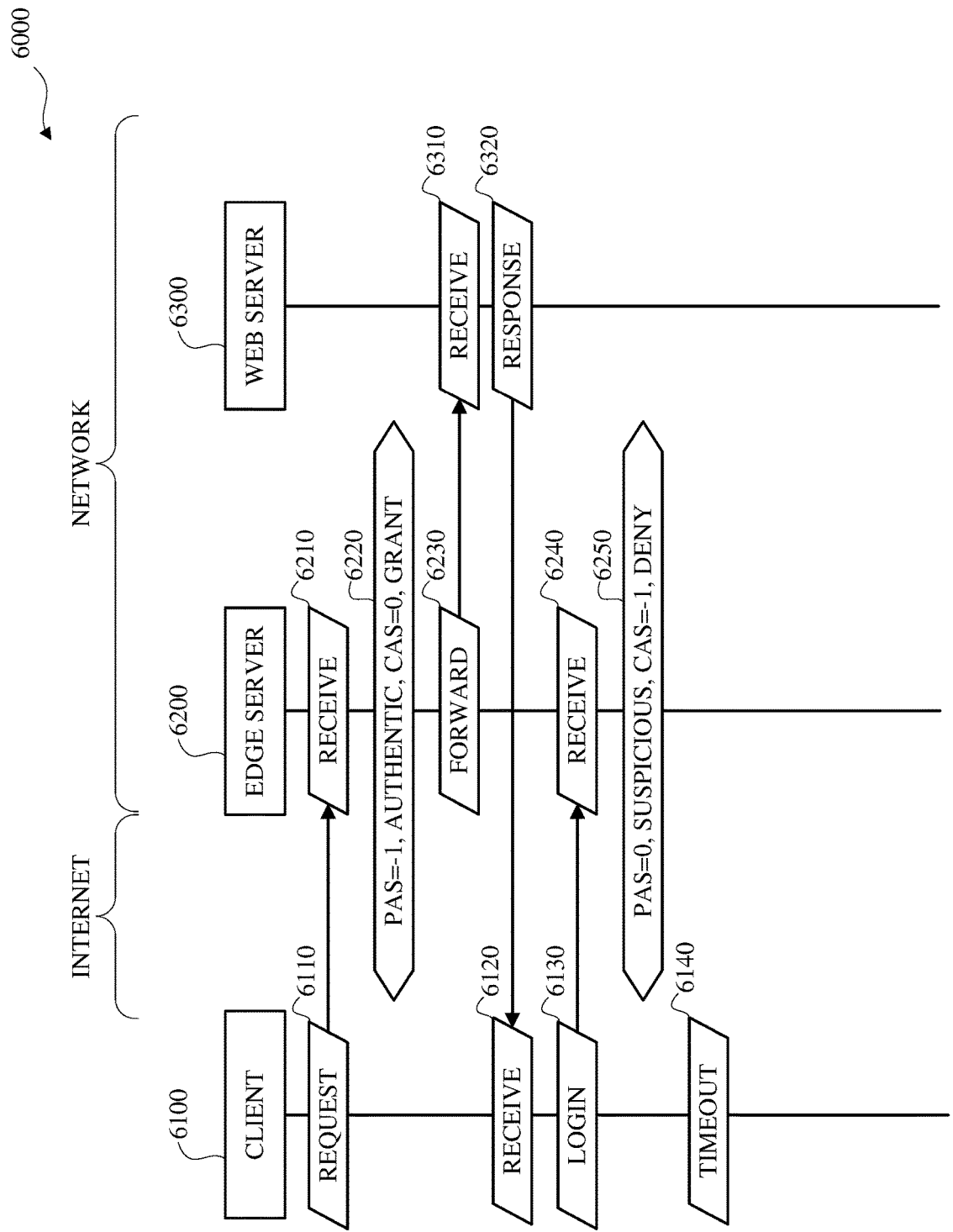
FIG. 6 is a flow diagram of an example of a second sequence of actions using adaptive online services access control.

FIGS. 5-6 are flow diagrams of examples of sequences of actions using adaptive online services access control. The examples of sequence of actions using adaptive online services access control shown in FIGS. 5-6 includes sequence or series of actions and corresponding communication in a client-server configuration, wherein a client device, such as a client computer, or a client application, such as a web-browser, operating on a client computer, in a client system, communicates with a server system, which is a controlled-access computing system, that implements adaptive online services access control, such as the adaptive online services access control 3000 shown in FIG. 3, which may include obtaining an access score 4000 as shown in FIG. 4.

FIG. 5 is a flow diagram of an example of a first sequence of actions using adaptive online services access control 5000. The example of the first sequence of actions using adaptive online services access control 5000 shown in FIG. 5 includes a sequence or series of actions and corresponding communication in a client-server configuration wherein a client device, such as a client computer, or a client application, such as a web-browser, operating on a client computer, in a client system 5100, communicates with a server system that implements adaptive online services access control.

As shown, a client device of the client system 5100, such as a client computer, or a client application, such as a web-browser, operating on a client computer, sends, or transmits, a first request at 5110, via the Internet as shown, or another electronic communications medium, to access a domain associated with a server system, such as an HTTP 'get' request indicating the domain name, or a corresponding IP address, of the domain associated with the server system. The client device of the client system 5100 may be one or more computing devices, such as one or more of the computing device 1000 shown in FIG. 1 or one or more of the computing and communications device 2300, 2410, 2420, 2510, 2520, 2530 shown in FIG. 2.

The first request may expressly identify a target feature of the server system, such as wherein the target feature is a web page of the server system, or may constructively identify the target feature, such as wherein an HTTP 'get' request from which data expressly identifying the target feature is omitted, or absent, is evaluated as a request for a defined web page of the server system.

A server device in the server system, such as an edge server 5200 of the server system, or a component thereof, such as a system access control monitor of the edge server 5200, performs adaptive online services access control, such as the adaptive online services access control 3000 shown in FIG. 3, which may include obtaining an access score, such as obtaining an access score 4000 as shown in FIG. 4, wherein the system access control monitor receives the first request at 5210. The edge server 5200 may be one or more computing devices, such as one or more of the computing device 1000 shown in FIG. 1 or one or more of the computing and communications device 2300, 2410, 2420, 2510, 2520, 2530 shown in FIG. 2.

At 5220, the system access control monitor determines that a previous access score (PAS) associated with the client system 5100 is unavailable and uses a defined score, such as negative one (−1), as the access score for the first request (PAS=−1). The system access control monitor identifies the first request as an authentic request using a defined library of access control patterns. The system access control monitor increments the access score associated with the context of the client system 5100 using a first activity modifier value, such as one (1), associated with accessing the requested feature to obtain a current access score (CAS) for the client system 5100, such as zero (−1+1=0, CAS=0). The system access control monitor determines that the requested system feature associated with the request, such as the web page associated with the domain, or landing page, is associated with an access threshold value, such as negative one (−1). The system access control monitor determines that the requested access is granted (0>−1).

At 5230, in response to determining that the requested access is granted at 5220, the system access control monitor forwards, sends, transmits, or otherwise makes available, the first request to the target system feature, which is the web page hosted by a web server 5300 of the server system, such as via a network, such as a local access network. The web server 5300 may be one or more computing devices, such as one or more of the computing device 1000 shown in FIG. 1 or one or more of the computing and communications device 2300, 2410, 2420, 2510, 2520, 2530 shown in FIG. 2.

At 5310, the web server receives the first request. At 5320, the web server generates and sends, transmits, or otherwise makes available, a response, including the requested web page, to the client system 5100.

At 5120, the client device receives the response, including the requested web page. In this example, the requested web page includes fields for logging in to the server system.

At 5130, the client device of the client system 5100, sends, transmits, or otherwise makes available, a request to login to the server system (login request), including authentication credentials, such as a username and password.

The system access control monitor of the edge server 5200, receives the login request at 5240.

At 5250, the system access control monitor, determines that the previous access score (PAS) associated with the client system 5100 is zero (PAS=0), corresponding to the current access score determined at 5220. The system access control monitor identifies the login request as an authentic request using the defined library of access control patterns. For example, the defined library of access control patterns may include a pattern indicating that a login request sent from a page that includes fields for logging in to the server system is authentic. The system access control monitor increments the access score associated with the context of the client system 5100 using a second activity modifier value of two (2) to obtain a current access score for the client system 5100 of two (0+2=2, CAS=2). The system access control monitor determines that the requested login system feature is associated with an access threshold value of one (1). The system access control monitor determines that the requested access is granted or allowed (2>1).

At 5260, in response to determining that the requested access is granted at 5250, the system access control monitor forwards, sends, transmits, or otherwise makes available, the login request to the target feature, which is the authentication (auth) server 5400 of the server system, such as via the network. The authentication server 5400 may be one or more computing devices, such as one or more of the computing device 1000 shown in FIG. 1 or one or more of the computing and communications device 2300, 2410, 2420, 2510, 2520, 2530 shown in FIG. 2.

At 5410, the authentication server receives the login request. At 5420, the authentication server authenticates the login data. At 5430, the authentication server generates and sends a request for a target web page to the web server 5300 on behalf of the client system 5100 (redirect request). For example, authenticating the login data at 5410 may include determining that the login data is valid, and the target web page may be a web page associated with authenticated access. In another example, authenticating the login data at

5410 may include determining that the login data is invalid, and the target web page may be a web page associated with login failure.

At 5330, the web server receives the redirect request sent at 5430. At 5340, the web server generates and sends a response, including the target web page, to the client system 5100. At 5140, the client device receives the target web page.

Although not shown expressly in FIG. 5, a third-party device, which may be a malicious device, may intercept, or otherwise access, the communications between the client device 5100 and the server system, which may include modifying or replacing one or more of the communications. For example, the third-party device may intercept and replace the request to login to the server system sent at 5130.

FIG. 6 is a flow diagram of an example of a second sequence of actions using adaptive online services access control 6000. The example of the second sequence of actions using adaptive online services access control 6000 shown in FIG. 6 includes a sequence or series of actions and corresponding communication in a client-server configuration wherein a client device, such as a client computer, or a client application, such as a web-browser, operating on a client computer, in a client system 6100, communicates with a server system, which is a controlled-access computing system, that implements adaptive online services access control.

As shown, a client device of the client system 6100, such as a client computer, or a client application, such as a web-browser, operating on a client computer, sends, or transmits, a first request 6110, via the Internet, to access a domain associated with a server system, such as a HTTP get request indicating the domain name, or a corresponding IP address, of the domain associated with the server system. The request may expressly identify a target feature of the server system, wherein the target feature is a web page of the server system, or may constructively identify the target feature, wherein an HTTP get request from which data expressly identifying target feature is omitted, or absent, is evaluated as a request for a default web page of the server system. The client device of the client system 6100 may be one or more computing devices, such as one or more of the computing device 1000 shown in FIG. 1 or one or more of the computing and communications device 2300, 2410, 2420, 2510, 2520, 2530 shown in FIG. 2.

A server device in the server system, such as an edge server 6200 of the server system, or a component thereof, such as a system access control monitor of the edge server 6200, performs adaptive online services access control, such as the adaptive online services access control 3000 shown in FIG. 3, which may include obtaining an access score, such as obtaining an access score 4000 as shown in FIG. 4, wherein the system access control monitor receives the first request at 6210. The edge server 6200 may be one or more computing devices, such as one or more of the computing device 1000 shown in FIG. 1 or one or more of the computing and communications device 2300, 2410, 2420, 2510, 2520, 2530 shown in FIG. 2.

At 6220, the system access control monitor, determines that a previous access score (PAS) associated with the client system 6100 is unavailable and the system access control monitor uses a defined score of negative one (−1) as the access score for the first request (PAS=−1). The system access control monitor identifies the first request as an authentic request using a defined library of access control patterns. The system access control monitor increments the access score associated with the context of the client system 6100 using a first activity modifier value of one (1) associated with accessing the requested web page to obtain a current access score (CAS) for the client system 6100 of zero (−1+1=0, CAS=0). The system access control monitor determines that the requested system feature associated with the request, a web page associated with the domain, or landing page, is associated with an access threshold value of negative one (−1). The system access control monitor determines that the requested access is granted (0>−1).

At 6230, in response to determining that the requested access is granted at 6220, the system access control monitor forwards, sends, transmits, or otherwise makes available, the first request to the target feature, which is the web page hosted by a web server 6300 of the server system, such as via a network, such as a local access network.

At 6310, the web server 6300 receives the first request. At 6320, the web server generates and sends a response, including the requested web page, to the client system 6100. The web server 6300 may be one or more computing devices, such as one or more of the computing device 1000 shown in FIG. 1 or one or more of the computing and communications device 2300, 2410, 2420, 2510, 2520, 2530 shown in FIG. 2.

At 6120, the client device receives the requested web page. Fields for logging in to the server system are omitted, or absent, from the requested web page.

At 6130, the client device of the client system 6100, sends, or transmits, a request to login to the server system, including authentication credentials, such as a username and password.

At 6240, the system access control monitor of the edge server 6200 receives the login request.

At 6250, the system access control monitor, determines that the previous access score (PAS) associated with the client system 6100 is zero (PAS=0). The system access control monitor identifies the login request as a suspicious request using the defined library of access control patterns. For example, the defined library of access control patterns may include a pattern indicating that a login request sent from a page that omits or excludes fields for logging in to the server system is suspicious. The system access control monitor decrements the access score associated with the context of the client system 6100 using an activity modifier value of negative one (−1) to obtain a current access score (CAS) for the client system 6100 of negative one (0−1=−1, CAS=−1). The system access control monitor determines that the requested login system feature is associated with an access threshold value of one (1). The system access control monitor determines that the requested access is denied, rejected, or prevented (−1<1).

At 6260, in response to determining that the requested access is denied at 6250, the system access control monitor takes no further action with respect to the login request. Although not shown expressly in FIG. 6, in some implementations, the system access control monitor may delete, or remove, the login request. Although not shown expressly in FIG. 6, in some implementations, the system access control monitor may notify the client device, another component of the server system, or both, that the login request was identified as suspicious, that the login request was denied, or both.

At 6140, the client device fails to receive a response to the login request and, subsequent to a defined temporal span, determines that the login request timed out.

Although not shown expressly in FIG. 6, a third-party device, which may be a malicious device, may intercept, or otherwise access, the communications between the client device 6100 and the server system, which may include modifying or replacing one or more of the communications. For example, the third-party device may intercept and replace the request to login to the server system sent at 6130.

Figure 7:
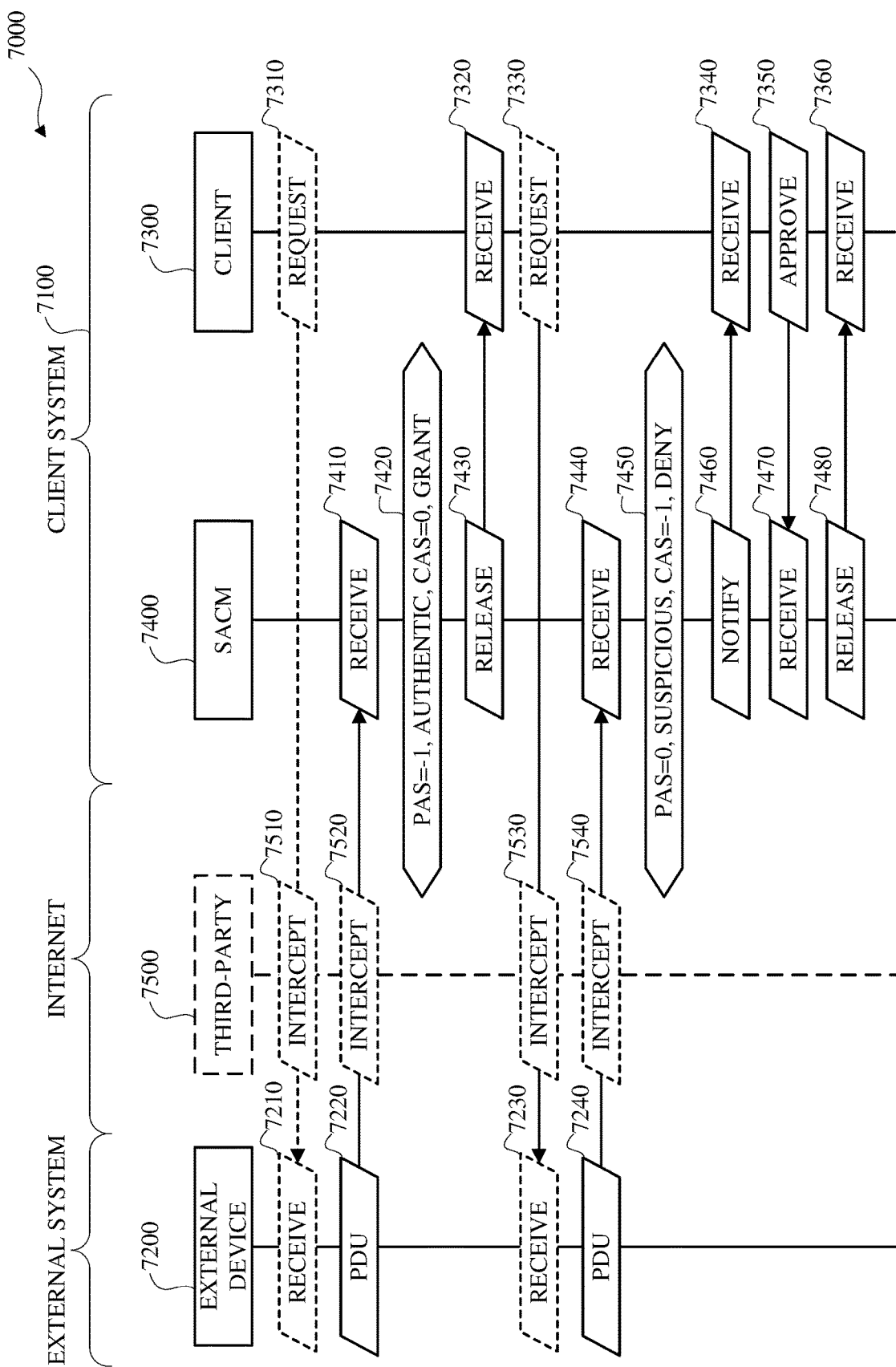
FIG. 7 is a flow diagram of an example of a sequence of actions using adaptive online system access control implemented on a client system.

FIG. 7 is a flow diagram of an example of a sequence of actions using adaptive online system access control 7000 implemented on a client system. The example of the sequence of actions using adaptive online system access control 7000 shown in FIG. 7 includes a sequence or series of actions and corresponding communication wherein a client system 7100, which is a controlled-access computing system, and which implements adaptive online system access control, communicates with an external device 7200 in an external system. In some implementations, a third-party device 7500 may intercept, or otherwise access, which may include modifying or replacing, one or more communications between the client system 7100 and the external device 7200. The third-party device 7500 is shown using broken lines to indicate that the malicious third-party device 7500 may be absent.

The sequence of actions and corresponding communications shown in FIG. 7 are described as being associated with a communication context. The communication context is a discrete unit of data or data structure including multiple units of data identified by the client system 7100, or a component thereof. For example, the communication context may be a session wherein respective communications and actions are associated with the communication context, such as using a session identifier. In some implementations, the communication context may be distinct from a session, may be used in the absence of a session, or may be associated with multiple sessions. For example, the communication context may be associated with the external system or the external device 7200 such that communications associated with the external system or the external device 7200 are associated with the communications context. In some implementations, the communication session may be associated with an application, a process, or a thread operating in the client system 7100 or with the client device 7300. In some implementations, the communication session may be associated with a type of communication.

As shown, the client system 7100 includes a client device 7300, such as a client computer, or a client application, such as a web-browser, operating on the client computer. The client device 7300 may be one or more computing devices, such as one or more of the computing device 1000 shown in FIG. 1 or one or more of the computing and communications device 2300, 2410, 2420, 2510, 2520, 2530 shown in FIG. 2.

The client system 7100 includes a system access control monitor (SACM) 7400. In some implementations, the system access control monitor 7400 may be implemented as a distinct hardware, or software, device as shown in FIG. 7. For example, the system access control monitor 7400 may be implemented by one or more computing devices, such as one or more of the computing device 1000 shown in FIG. 1 or one or more of the computing and communications device 2300, 2410, 2420, 2510, 2520, 2530 shown in FIG. 2. In some implementations, the system access control monitor 7400 may be implemented on or by a component of the client system 7100, such as a firewall, modem, router, gateway, or bridge. Although, the system access control monitor 7400 is shown as a distinct component of the client system 7100 in FIG. 7, in some implementations, the system access control monitor 7400 may be implemented at the client device 7300, such as by or on a network interface card of the client device 7300, by the operating system of the client device 7300, or as an application layer component implemented on the client device 7300 capable of intercepting, or otherwise accessing, incoming communications at the client device 7300, such as prior to other applications at the client device 7300 accessing the communications. In some implementations, the client system 7100 may include a network, such as a local area network, and the system access control monitor 7400, or a device implementing the system access control monitor 7400, may communicate with the client device 7300 via the network.

As shown, the client device 7300 sends, or transmits, a first request 7310, via the Internet, to the external system, such as to the external device 7200, or a component thereof. The first request 7310 is associated with the communication context. In some implementations, the third-party device 7500, which may be a malicious device, may intercept, or otherwise access, the first request at 7510. The third-party device 7500 may be one or more computing devices, such as one or more of the computing device 1000 shown in FIG. 1 or one or more of the computing and communications device 2300, 2410, 2420, 2510, 2520, 2530 shown in FIG. 2. In some implementations, the third-party device 7500 may modify or replace the first request. The third-party device 7500 sends, or forwards, the first request, which may be a modified or replaced first request, to the external device 7200.

The external device 7200 receives the first request, which may be a modified or replaced first request, at 7210. The first request, including sending the first request at 7310, intercepting the first request at 7510, and receiving the first request at 7210, is shown using broken lines to indicate that the first request, including sending the first request at 7310, intercepting the first request at 7510, and receiving the first request at 7210, may be omitted. Although not shown in FIG. 7, the system access control monitor 7400 may receive, intercept, or otherwise access, the first request and may send, or forward, the first request to the external device 7200.

At 7220, the external device 7200, or a component thereof, sends a protocol data unit (PDU), or other communication, such as a response to the first request received at 7210 or a push notification, to the client device 7300. Although described as a protocol data unit, the communication may include multiple protocol data units.

In some implementations, as shown at 7520, the third-party device 7500 may intercept, or otherwise access, the protocol data unit, or a portion thereof, which may include modifying or replacing the protocol data unit, and may send, or forward, the protocol data unit, which may be a modified or replaced protocol data unit, to the client system 7100.

In some implementations, the external device 7200 may omit sending the protocol data unit at 7220 and the third-party device 7500 may send the protocol data unit to the client system 7100, including data indicating that the protocol data unit originated at, or was sent by, the external device 7200 (impersonating the external device 7200).

The system access control monitor 7400 performs adaptive online system access control, which may be similar to the adaptive online services access control 3000 shown in FIG. 3, except as is described herein or as is otherwise clear from context, and which may include obtaining an access score, such as obtaining an access score 4000 as shown in FIG. 4.

At 7410, the system access control monitor 7400 receives, obtains, or otherwise accesses, the protocol data unit sent at 7220, which may be a modified or replaced protocol data unit, modified or replaced at 7520, or which may be a protocol data unit otherwise sent at 7520 impersonating the external device 7200. For example, a network interface unit of the system access control monitor 7400, or of the device implementing the system access control monitor 7400, which may be the client device 7300, receives the protocol data unit from one or more communication links, which may include receiving and aggregating multiple lower layer data units, such as packets, and the system access control monitor 7400 obtains the protocol data unit, or a portion thereof, such as a portion including header data, from the network interface unit, or access the protocol data unit stored in the network interface unit, prior to other components of the client system 7100 accessing the protocol data unit. The protocol data unit, or the portion thereof accessed by the system access control monitor 7400, includes data identifying the external system, or the external device 7200, as the origin or sender of the protocol data unit. For example, the protocol data unit may be an application layer protocol data unit, such as a presentation layer protocol data unit, a session layer protocol data unit, a transport layer protocol data unit, such as a packet, a network layer protocol data unit. Although described as a protocol data unit, other communications data, such as communications data prior to encapsulation in a protocol data unit, may be used.

At 7420, the system access control monitor 7400, determines that a previous access score (PAS) associated with the communication context is unavailable and the system access control monitor 7400 uses a defined score of negative one (−1) as the access score for the protocol data unit received at 7410 (PAS=−1). The system access control monitor 7400 identifies the protocol data unit received at 7410 as an authentic protocol data unit using a defined library of access control patterns. The system access control monitor 7400 increments the access score associated with the communication context using a first activity modifier value of one (1) associated with a protocol data unit type of the protocol data unit received at 7410 to obtain a current access score (CAS) for the communication context of zero (−1+1=0, CAS=0). The system access control monitor 7400 determines that a feature of the client system 7100 corresponding to a target destination of the protocol data unit received at 7410, the client device 7300, is associated with an access threshold value of negative one (−1). The system access control monitor 7400 determines that the current access score is greater than access threshold value of negative one (−1) and determines that authentic protocol data unit is allowed, or granted access. At 7430, the system access control monitor 7400 releases, forwards, sends, transmits, or otherwise makes available, the protocol data unit received at 7410 to the target destination of the protocol data unit received at 7410, which is client device 7300, or a component thereof, such as an application or process operating on the client device 7300. For example, releasing the protocol data unit may include notifying the target destination of the protocol data unit is available. At 7320, the client device 7300 receives, obtains, or otherwise accesses, the protocol data unit sent at 7220, which may be a modified or replaced protocol data unit, modified or replaced at 7520, and forwarded at 7430.

At 7330, the client device 7300 generates and sends a second request, via the Internet, to the external device 7200, or a component thereof. In some implementations, the third-party device 7500, may intercept, or otherwise access, the second request at 7530. In some implementations, the third-party device 7500 may modify or replace the second request. The third-party device 7500 sends, or forwards, the second request, which may be a modified or replaced second request, to the external device 7200. A server device in the external device 7200 receives the second request, which may be a modified or replaced first request, at 7230. The second request, including sending the second request at 7330, intercepting the second request at 7530, and receiving the second request at 7230, is shown using broken lines to indicate that the second request, including sending the second request at 7330, intercepting the second request at 7530, and receiving the second request at 7230, may be omitted. Although not shown in FIG. 7, the system access control monitor 7400 may receive, intercept, or otherwise access, the second request and may send, or forward, the second request to the external device 7200.

At 7240, the external device 7200, or a component thereof, sends a second protocol data unit, or other communication, such as a response to the second request received at 7230 or a push notification, to the client device 7300.

In some implementations, as shown at 7540, the third-party device 7500 may intercept, or otherwise access, the second protocol data unit, which may include modifying or replacing the second protocol data unit, and may send, or forward, the second protocol data unit, which may be a modified or replaced second protocol data unit, to the client device 7300. In some implementations, the external device 7200 may omit sending the second protocol data unit at 7240 and the third-party device 7500 may send the second protocol data unit to the client system 7100, including data indicating that the second protocol data unit originated at, or was sent by, the external device 7200 (impersonating the external device 7200).

At 7440, the system access control monitor 7400 receives, obtains, or otherwise accesses, the second protocol data unit sent at 7240, which may be a modified or replaced second protocol data unit, modified or replaced at 7540, or another second protocol data unit impersonating the external device 7200. At 7450, the system access control monitor 7400, determines that the second protocol data unit is associated with the communication context and determines that the previous access score (PAS) associated with the communication context is zero (0), corresponding to the current access score determined at 7420. The system access control monitor 7400 uses the previous access score of zero (0) as the access score for the second protocol data unit received at 7440 (PAS=0). The system access control monitor 7400 identifies the second protocol data unit received at 7440 as a suspicious protocol data unit using the defined library of access control patterns.

The system access control monitor 7400 decrements the access score associated with the communication context using an activity modifier value of negative one (−1), which may be an activity modifier value associated with the of access control patterns used to identify the second protocol data unit as a suspicious protocol data unit, to obtain a current access score for the communication context of negative one (0−1=−1, CAS=−1). The system access control monitor 7400 determines that a feature of the client system 7100 corresponding to the communication context, such as for a target destination, such as an application layer destination, of the second protocol data unit received at 7440, is associated with an access threshold value of one (1). The system access control monitor 7400 automatically determines that the current access score is less than (−1<1) the access threshold value of one (1). The system access control monitor 7400 determines that the second protocol data unit is denied, rejected, or prevented from being accessed by other components of the client system 7100 and prevents the other components of the client system 7100, such as the client device 7300, from accessing the second protocol data unit.

In some implementations, at 7460, the system access control monitor 7400 may quarantine, or otherwise safely store, the second protocol data unit and may generate and send a notification to the client device 7300, or another component of the client system 7100, indicating that the second protocol data unit was identified as suspicious and quarantined. Sending the notification may include outputting, displaying, or otherwise presenting the notification, or a portion thereof, to a user of the client device. Although not shown expressly in FIG. 7, in some implementations, the system access control monitor 7400 may determine that the current access score is equal to the access threshold value, and the system access control monitor 7400 may include information indicating that the protocol data unit is delayed pending further data.

At 7340, the client device 7300, or another component of the client system 7100, receives the notification. In some implementations, at 7350, the client device 7300, or another component of the client system 7100, may approve the second protocol data unit, which may include generating and sending an approval message, or other communication, to the system access control monitor 7400. At 7470, the system access control monitor 7400 may receive the approval. At 7480, in response to receiving the approval at 7470, the system access control monitor 7400 releases, forwards, sends, transmits, or otherwise makes available, the second protocol data unit, such as to the target destination of the second protocol data unit. The system access control monitor 7400, in response to receiving the approval at 7470, may increment the access score associated with the communication context, such as twice using the activity modifier value used at 7440, or once by an amount double the activity modifier value used at 7440. The system access control monitor 7400, in response to receiving the approval at 7470, may update the access control patterns used to identify the second protocol data unit as a suspicious protocol data unit, such as to reduce the probability that a similar protocol data unit subsequently received is identified by the updated access control patterns as a suspicious protocol data unit. At 7360 the client device 7300 may receive the second protocol data unit.

Although not expressly shown in FIG. 7, in some implementations, the approval at 7350, the approval reception at 7470, the forwarding at 7480, and the reception at 7360 may be omitted. Although not expressly shown in FIG. 7, in some implementations, the notifying at 7460, the approval at 7350, the approval reception at 7470, the forwarding at 7480, and the reception at 7360 may be omitted. Although not expressly shown in FIG. 7, the system access control monitor 7400 may take no further action with respect to the second protocol data unit, or may delete, or otherwise remove, the second protocol data unit.

Figure 8:
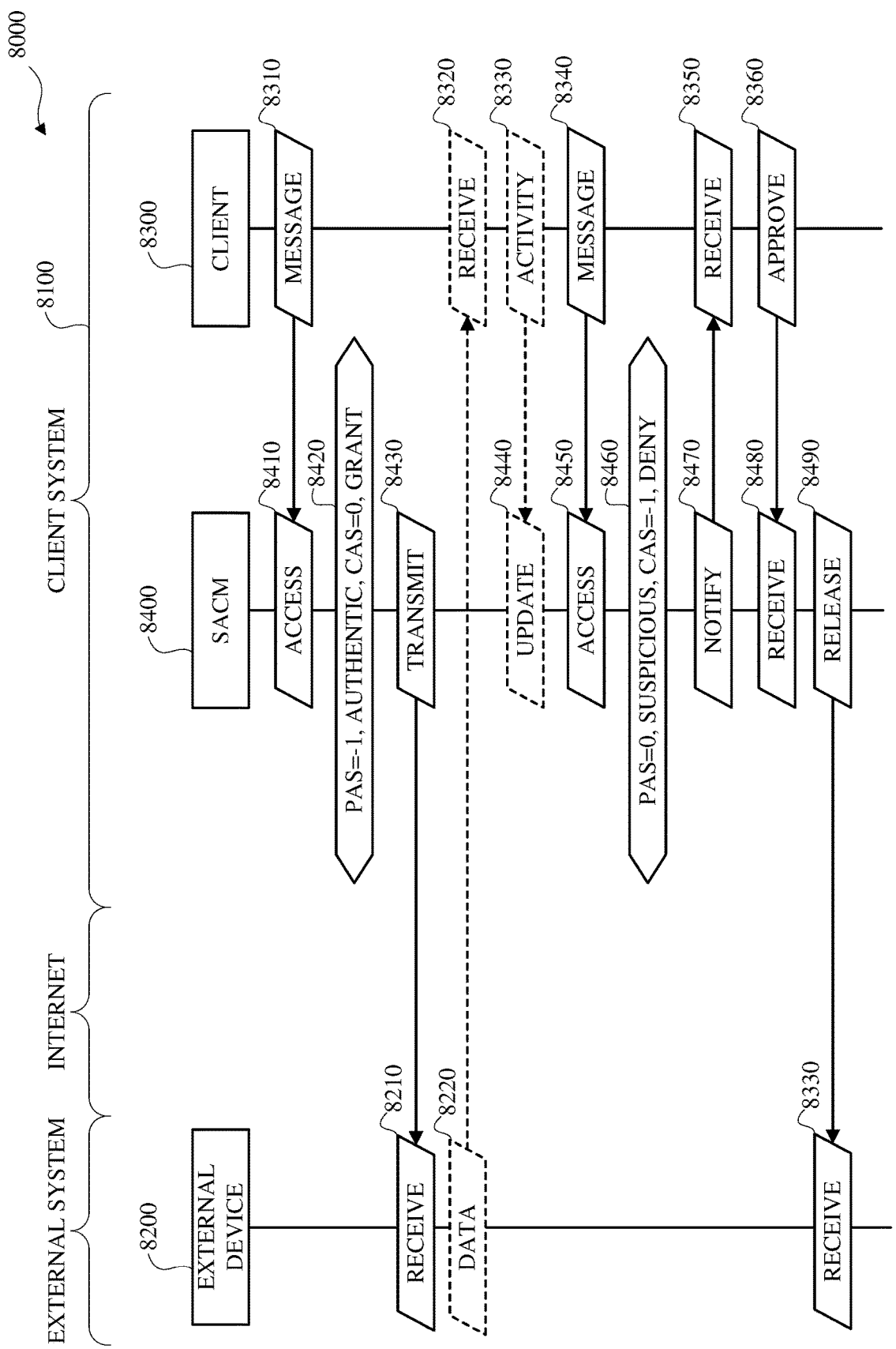
FIG. 8 is a flow diagram of an example of a sequence of actions using adaptive online service access control implemented on a client system.

FIG. 8 is a flow diagram of an example of a sequence of actions using adaptive online service access control 8000 implemented on a client system 8100. The example of the sequence of actions using adaptive online service access control 8000 shown in FIG. 8 includes a sequence or series of actions and corresponding communication wherein a client system 8100, which is a controlled-access computing system, and which implements adaptive online service access control, communicates with an external device 8200 in an external system.

The sequence of actions and corresponding communications shown in FIG. 8 are described as being associated with a communication context. The communication context is a discrete unit of data, or a data structure including multiple units of data, identified by the client system 8100, or a component thereof. For example, the communication context may be a session wherein respective communications and actions are associated with the communication context, such as using a session identifier. In some implementations, the communication context may be distinct from a session, may be used in the absence of a session, or may be associated with multiple sessions. For example, the communication context may be associated with the external system or the external device 8200 such that communications associated with the external system or the external device 8200 are associated with the communications context. In some implementations, the communication session may be associated with an application, a process, or a thread operating in the client system 8100 or with the client device 8300. In some implementations, the communication session may be associated with a type of communication.

As shown, the client system 8100 includes a client device 8300, such as a client computer, or a client application, such as a web-browser, operating on the client computer. The client device 8300 may be one or more computing devices, such as one or more of the computing device 1000 shown in FIG. 1 or one or more of the computing and communications device 2300, 2410, 2420, 2510, 2520, 2530 shown in FIG. 2.

The client system 8100 includes a system access control monitor (SACM) 8400. In some implementations, the system access control monitor 8400 may be implemented as a distinct hardware, or software, device as shown in FIG. 8. For example, the system access control monitor 8400 may be implemented by one or more computing devices, such as one or more of the computing device 1000 shown in FIG. 1 or one or more of the computing and communications device 2300, 2410, 2420, 2510, 2520, 2530 shown in FIG. 2. In some implementations, the system access control monitor 8400 may be implemented on or by a component of the client system 8100, such as a firewall, modem, router, gateway, or bridge. Although, the system access control monitor 8400 is shown as a distinct component of the client system 8100 in FIG. 8, in some implementations, the system access control monitor 8400 may be implemented at the client device 8300, such as by or on a network interface card or unit of the client device 8300, by the operating system of the client device 8300, or as an application layer component implemented on the client device 8300 capable of intercepting, or otherwise accessing, incoming communications at the client device 8300, such as prior to other applications at the client device 8300 accessing the communications. In some implementations, the client system 8100 may include a network, such as a local area network, and the system access control monitor 8400, or a device implementing the system access control monitor 8400, may communicate with the client device 8300 via the network.

As shown, the client device 8300 generates a first message 8310 for transmission, via the Internet, to the external system, such as to the external device 8200, or a component thereof. For example, the client device 8300, or a component thereof, such as a process, may include data identifying the external device 8200, such as an internet protocol address of the external device 8200, in the first message 8310. The client device 8300, or the component thereof, sends, submits, or enqueues, the first message 8310 for transmission to the external device 8200, such as by sending, submitting, or enqueueing, the first message 8310 at, or in, a network interface unit of the client device 8300, or the client system 8100. The first message 8310 is associated with the communication context.

The system access control monitor 8400 accesses the first message 8310 prior to transmission of the first message 8310 external to the client system 8100. The system access control monitor 8400 performs adaptive online service access control, which may be similar to the adaptive online services access control 3000 shown in FIG. 3, except as is described herein or as is otherwise clear from context, and which may include obtaining an access score, such as obtaining an access score 4000 as shown in FIG. 4.

At 8410, the system access control monitor 8400 receives, obtains, or otherwise accesses, the accesses the first message 8310, or a portion thereof, such as a header portion, prior to transmission of the first message 8310 external to the client system 8100. The first message 8310, or the portion thereof accessed by the system access control monitor 8400, includes data identifying the external system, or the external device 8200, as the target or destination of the first message 8310.

At 8420, the system access control monitor 8400, determines that a previous access score (PAS) associated with the communication context is unavailable and the system access control monitor 8400 uses a defined score of negative one (−1) as the access score for the first message 8310 (PAS=−1). The system access control monitor 8400 identifies the first message 8310 as authentic using a defined library of access control patterns. The system access control monitor 8400 increments the access score associated with the communication context using a first activity modifier value of one (1) associated with a message type of the first message 8310 to obtain a current access score (CAS) for the communication context of zero (−1+1=0, CAS=0). The system access control monitor 8400 determines that the communication context is associated with an access threshold value of negative one (−1). At 8430, the system access control monitor 8400 releases, such as forwards, sends, transmits, or otherwise makes available, the first message 8310 to the target destination, which is the external device 8200. At 8210, the external device 8200 receives, obtains, or otherwise accesses, the first message 8310.

As shown, at 8220, the external device 8200 sends data, such as one or more protocol data units to the client device 8300, which the client device 8300 receives at 8320. The data sent at 8220 and received at 8320 is shown using broken lines to indicate that sending data at 8220 and receiving data at 8320 may be omitted. For example, the first message 8310 may be a request for a web page hosted by the external device 8200 and the data received at 8320 may be data representing the requested web page. In some implementations, although not expressly shown in FIG. 8, a malicious third-party device may intercept, which may include modifying, the data received at 8320 or the data received at 8320 may be data sent by a malicious third-party device impersonating the external device 8200.

At 8330, one or more internal activities are performed at or by the client device 8300. At 8440, the system access control monitor 8400 detects the internal activities performed at or by the client device 8300 and updates the current access score for the communication context in accordance therewith. The identified or detected activities, or actions, may include user interface interaction activity or events, such as activity or events indicating pointer clicks or scrolling. For example, the first message 8310 may be a request for a web page hosted by the external device 8200, the data received at 8320 may be data representing the requested web page, the client device 8300 may output, present, or display the web page, such as using a web-browser, or another application or process, operating on the client device 8300, and the detected, or otherwise identified, activities, actions, or events, may correspond with user input associated with the web page, such as movement of a pointer or touch screen events. In some implementations, one or more of the activities, actions, or events, may be detected, or otherwise identified, in accordance with operations of a malicious process operating at the client device 8300. In some implementations, an application, or process, such as the web-browser, operating on the client device 8300 may report the activities, actions, or events to the system access control monitor 8400. In some implementations, the detected, or otherwise identified, activities, actions, or events, may be associated with the communication context.

Updating the current access score, at 8440, for the communication context is similar to determining the current access score at 8420 or at 8460, except as is described herein or as is otherwise clear from context. For example, the current access score may be updated at 8440 in response to detecting respective activities, actions, or events, or in response to detecting groups, which may be sequences, of activities, actions, or events, such as within a defined temporal span. Updating the current access score, at 8440, includes determining whether the respective activities, actions, or events, or groups or sequences thereof, are suspicious using the defined library of access control patterns. In response to determining that the respective activities, actions, or events, or groups or sequences thereof, are suspicious, the current access score for the communication context may be decreased or decremented as described herein. In response to determining that the respective activities, actions, or events, or groups or sequences thereof, are unsuspicious, the current access score for the communication context may be increased or incremented as described herein. The activity at 8330 and the updating at 8440 are shown using broken lines to indicate that the activity at 8330, the updating at 8440, or both, may be omitted.

At 8340, the client device 8300 generates a second message for transmission, such as via the Internet, to the external system, such as to the external device 8200, or a component thereof. For example, the client device 8300, or a component thereof, such as a process, may include data identifying the external device 8200, such as the internet protocol address of the external device 8200, in the second message. The client device 8300, or the component thereof, sends, submits, or enqueues, the second message for transmission to the external device 8200, such as by sending, submitting, or enqueueing, the second message to, at, or in, a network interface unit of the client device 8300, or the client system 8100. The second message is associated with the communication context.

The system access control monitor 8400 accesses the second message prior to transmission of the second message external to the client system 8100. The system access control monitor 8400 performs adaptive online service access control, which may be similar to the adaptive online services access control 3000 shown in FIG. 3, except as is described herein or as is otherwise clear from context, and which may include obtaining an access score, such as obtaining an access score 4000 as shown in FIG. 4.

At 8450, the system access control monitor 8400 receives, obtains, or otherwise accesses, the accesses the second message, or a portion thereof, such as a header portion, prior to transmission of the second message external to the client system 8100. The second message, or the portion thereof accessed by the system access control monitor 8400, includes data identifying the external system, or the external device 8200, as the target or destination of the second message.

At 8460, the system access control monitor 8400, determines that the second message is associated with the communication context and determines that the previous access score (PAS) associated with the communication context is zero (0), corresponding to the current access score determined at 8420, or has another value as updated at 8440. The system access control monitor 8400 uses the previous access score of zero (0) as the access score for the second message (PAS=0). The system access control monitor 8400 identifies the second message as a suspicious message using the defined library of access control patterns.

The system access control monitor 8400 decrements the access score associated with the communication context using an activity modifier value of negative one (−1), which may be an activity modifier value associated with the of access control patterns used to identify the second message as suspicious, to obtain a current access score for the communication context of negative one (0−1=−1, CAS=−1). The system access control monitor 8400 determines that the communication context associated with an access threshold value of one (1). The system access control monitor 8400 determines that the second message is denied, rejected, or prevented (−1<1) from being sent, transmitted, or otherwise made available, external to the client system 8100 and prevents the second message from being transmitted, sent, or otherwise made available, external to the client system 8100.

In some implementations, at 8460, the system access control monitor 8400 may quarantine, or otherwise safely store, the second message and may generate and send a notification to the client device 8300, or another component of the client system 8100, indicating that the second message was identified as suspicious and quarantined at 8470.

At 8350, the client device 8300, or another component of the client system 8100, receives the notification. In some implementations, at 8360, the client device 8300, or another component of the client system 8100, may approve the second message, which may include generating and sending an approval message, or other communication, to the system access control monitor 8400. At 8480, the system access control monitor 8400 may receive the approval. At 8490, in response to receiving the approval at 8480, the system access control monitor 8400 may send, transmit, or otherwise make available, the second message to the external device 8200. The system access control monitor 8400, in response to receiving the approval at 8480, may increment the access score associated with the communication context, such as twice using the activity modifier value used at 8460, or once by an amount double the activity modifier value used at 8460. The system access control monitor 8400, in response to receiving the approval at 8480, may update the access control patterns used to identify the second message as suspicious, such as to reduce the probability that a similar message subsequently obtained is identified by the updated access control patterns as suspicious. At 8330 the external device 8200 may receive the second message.

Although not expressly shown in FIG. 8, in some implementations, the approval at 8360, the approval reception at 8480, the release at 8490, and the reception at 8330 may be omitted. Although not expressly shown in FIG. 8, in some implementations, the notifying at 8470, the approval at 8360, the approval reception at 8480, the release at 8490, and the reception at 8330 may be omitted. Although not expressly shown in FIG. 8, the system access control monitor 8400 may take no further action with respect to the second message, or may delete, or otherwise remove, the second message.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for adaptive online system access control, the method comprising:
   obtaining, by a system access control monitor of a client system, from a network interface unit of the client system, a protocol data unit sent to the client system by an external device, wherein the protocol data unit is associated with a communication context, and wherein obtaining the protocol data unit includes:
      prior to other components of the client system accessing the protocol data unit:
         identifying, as a current access score for the protocol data unit, a sum of a previous access score associated with the communication context and a modifier value determined for the protocol data unit; and
         responsive to determining that the current access score is less than an access threshold value, preventing the other components of the client system from accessing the protocol data unit.

2. The method of claim 1, wherein identifying the current access score includes:
   determining, by the system access control monitor, the current access score for the protocol data unit in response to a determination, by the system access control monitor, whether the protocol data unit is suspicious.

3. The method of claim 2, wherein:
   in response to a determination, by the system access control monitor, that the protocol data unit is suspicious, determining the current access score includes:
      identifying, as the modifier value, a suspicious activity modifier value for the protocol data unit.

4. The method of claim 2, wherein:
   in response to a determination, by the system access control monitor, that the protocol data unit is authentic, determining the current access score includes:
      identifying, as the modifier value, an authentic activity modifier value for the protocol data unit.

5. The method of claim 1, wherein determining that the current access score is less than the access threshold value includes:
   obtaining, by the system access control monitor, the access threshold value for the communication context.

6. The method of claim 1, further comprising:
   in response to a determination, by the system access control monitor, that the current access score is equal to the access threshold value, outputting, to a user of the client system, a notification indicating that the protocol data unit is delayed pending further data.

7. The method of claim 6, further comprising:
   in response to a determination, by the system access control monitor, that the current access score is greater than the access threshold value, releasing the protocol data unit to a target destination of the protocol data unit in the client system.

8. An apparatus of a controlled-access computing system comprising:
   a non-transitory computer-readable storage medium; and
   a processor that executes instructions stored in the non-transitory computer-readable storage medium to:
      obtain, from a network interface unit of the controlled-access computing system, a protocol data unit sent to the controlled-access computing system by an external device, wherein the protocol data unit is associated with a communication context, and to obtain the protocol data unit the processor executes the instructions to:
         prior to other components of the controlled-access computing system accessing the protocol data unit:
            identify, as a current access score for the protocol data unit, a sum of a previous access score associated with the communication context and a modifier value determined for the protocol data unit; and
            responsive to an automatic determination that the current access score is less than an access threshold value, preventing the other components of the controlled-access computing system from accessing the protocol data unit.

9. The apparatus of claim 8, wherein to identify the current access score, the processor executes the instructions to:
   obtain a previous access score corresponding to the communication context.

10. The apparatus of claim 9, wherein to identify the current access score, the processor executes the instructions to:
responsive to an automatic determination that the protocol data unit is suspicious:
identify a suspicious activity modifier value for the protocol data unit; and
identify, as the current access score, a sum of the previous access score and the suspicious activity modifier value.

11. The apparatus of claim 9, wherein to identify the current access score, the processor executes the instructions to:
responsive to an automatic determination that the protocol data unit is authentic:
identify an authentic activity modifier value for the protocol data unit; and
identify, as the current access score, a sum of the previous access score and the authentic activity modifier value.

12. The apparatus of claim 8, wherein, to automatically determine that the current access score is less than an access threshold value, the processor executes the instructions to:
obtain the access threshold value for the communication context.

13. The apparatus of claim 8, wherein the processor executes instructions stored in the non-transitory computer-readable storage medium to:
prior to other components of the controlled-access computing system accessing the protocol data unit:
in response to an automatic determination that the current access score is equal to the access threshold value, output, to a user of the controlled-access computing system, a notification indicating that the protocol data unit is delayed pending further data.

14. The apparatus of claim 8, wherein the processor executes instructions stored in the non-transitory computer-readable storage medium to:
prior to other components of the controlled-access computing system accessing the protocol data unit:
in response to an automatic determination that the current access score is greater than the access threshold value, release the protocol data unit to a target destination of the protocol data unit in the controlled-access computing system.

15. A non-transitory computer-readable storage medium, comprising executable instructions that are executed by a processor to perform:
obtaining, by a system access control monitor of a controlled-access computing system, from a network interface unit of the controlled-access computing system, a protocol data unit sent to the controlled-access computing system by an external device, wherein the protocol data unit is associated with a communication context, and wherein obtaining the protocol data unit includes:
prior to other components of the controlled-access computing system accessing the protocol data unit:
identifying, as a current access score for the protocol data unit, a sum of a previous access score associated with the communication context and a modifier value determined for the protocol data unit; and
responsive to determining that the current access score is less than an access threshold value, preventing the other components of the controlled-access computing system from accessing the protocol data unit.

16. The non-transitory computer-readable storage medium of claim 15, wherein identifying the current access score includes:
obtaining, by the system access control monitor, a previous access score corresponding to the communication context; and
determining, by the system access control monitor, the current access score for the protocol data unit based on the previous access score and a determination, by the system access control monitor, whether the protocol data unit is suspicious.

17. The non-transitory computer-readable storage medium of claim 16, wherein:
in response to a determination, by the system access control monitor, that the protocol data unit is suspicious, determining the current access score includes:
identifying a suspicious activity modifier value for the protocol data unit; and
identifying, as the current access score, a sum of the previous access score and the suspicious activity modifier value; and
in response to a determination, by the system access control monitor, that the protocol data unit is authentic, determining the current access score includes:
identifying an authentic activity modifier value for the protocol data unit; and
identifying, as the current access score, a sum of the previous access score and the authentic activity modifier value.

18. The non-transitory computer-readable storage medium of claim 16, wherein responding to the protocol data unit includes:
obtaining, by the system access control monitor, an access threshold value for the communication context; and
comparing, by the system access control monitor, the access threshold value and the current access score.

19. The non-transitory computer-readable storage medium of claim 18, further comprising:
in response to a determination, by the system access control monitor, that the current access score is equal to the access threshold value, outputting, to a user of the controlled-access computing system, a notification indicating that the protocol data unit is delayed pending further data.

20. The non-transitory computer-readable storage medium of claim 18, further comprising:
in response to a determination, by the system access control monitor, that the current access score is greater than the access threshold value, releasing the protocol data unit to a target destination of the protocol data unit in the controlled-access computing system.

* * * * *